(12) United States Patent
Sugita et al.

(10) Patent No.: US 9,059,626 B2
(45) Date of Patent: Jun. 16, 2015

(54) ELECTRIC MACHINE WITH LINEAR MOVER

(71) Applicant: SANYO DENKI CO., LTD., Tokyo (JP)

(72) Inventors: Satoshi Sugita, Nagano (JP); Yuqi Tang, Nagano (JP); Yasushi Misawa, Nagano (JP)

(73) Assignee: SANYO DENKI CO., LTD., Tokyo (JP)

( * ) Notice: Subject to any disclaimer, the term of this patent is extended or adjusted under 35 U.S.C. 154(b) by 399 days.

(21) Appl. No.: 13/661,396

(22) Filed: Oct. 26, 2012

(65) Prior Publication Data

US 2013/0106204 A1 May 2, 2013

(30) Foreign Application Priority Data

Oct. 28, 2011 (JP) ................. 2011-237772

(51) Int. Cl.
*H02K 33/00* (2006.01)
*H02K 41/03* (2006.01)
*H02K 1/24* (2006.01)

(52) U.S. Cl.
CPC ............ *H02K 41/033* (2013.01); *H02K 1/246* (2013.01); *H02K 2207/03* (2013.01); *H02K 2213/03* (2013.01)

(58) Field of Classification Search
None
See application file for complete search history.

(56) References Cited

U.S. PATENT DOCUMENTS

| | | | | |
|---|---|---|---|---|
| 4,785,816 A | * | 11/1988 | Dow et al. | 600/446 |
| 5,345,206 A | * | 9/1994 | Morcos | 335/222 |
| 5,434,549 A | * | 7/1995 | Hirabayashi et al. | 335/229 |
| 6,748,907 B2 | * | 6/2004 | Malmquist et al. | 123/46 E |
| 7,825,548 B2 | * | 11/2010 | Maemura et al. | 310/12.02 |
| 8,198,760 B2 | * | 6/2012 | Sugita et al. | 310/12.21 |
| 2009/0289509 A1 | * | 11/2009 | Hoshi et al. | 310/12.33 |

FOREIGN PATENT DOCUMENTS

WO 2009/028369 A1 3/2009

\* cited by examiner

*Primary Examiner* — Tran Ngyuen
(74) *Attorney, Agent, or Firm* — Rankin, Hill & Clark LLP

(57) ABSTRACT

An electric machine includes a magnetic pole piece array including a plurality of magnetic pole pieces spaced along a permanent magnet array. The permanent magnet array is in immovable relation with winding portions. The pitch of a plurality of permanent magnets and the pitch of a plurality of magnetic pole pieces are determined such that magnetic flux flows through two of the permanent magnets magnetized in the same direction and located in the permanent magnet array with one permanent magnet interposed between the two permanent magnets, and also flows through one or two of the magnetic pole pieces facing the one permanent magnet interposed between the two permanent magnets and magnetized in a direction of magnetization different from the direction of magnetization of the two permanent magnets.

30 Claims, 29 Drawing Sheets

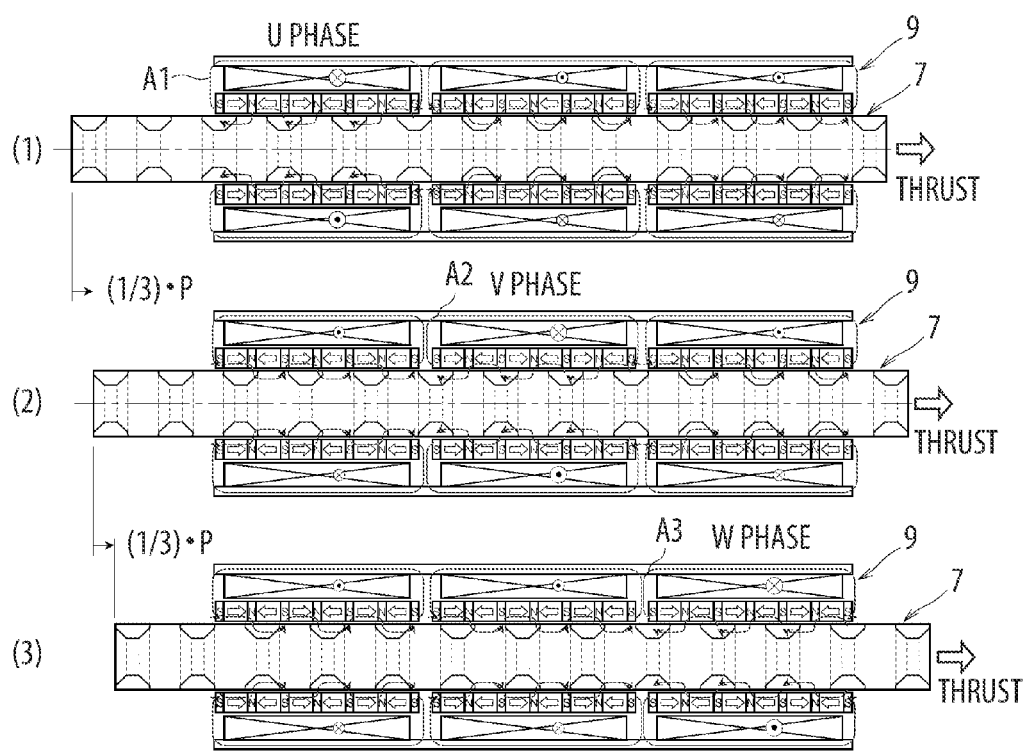

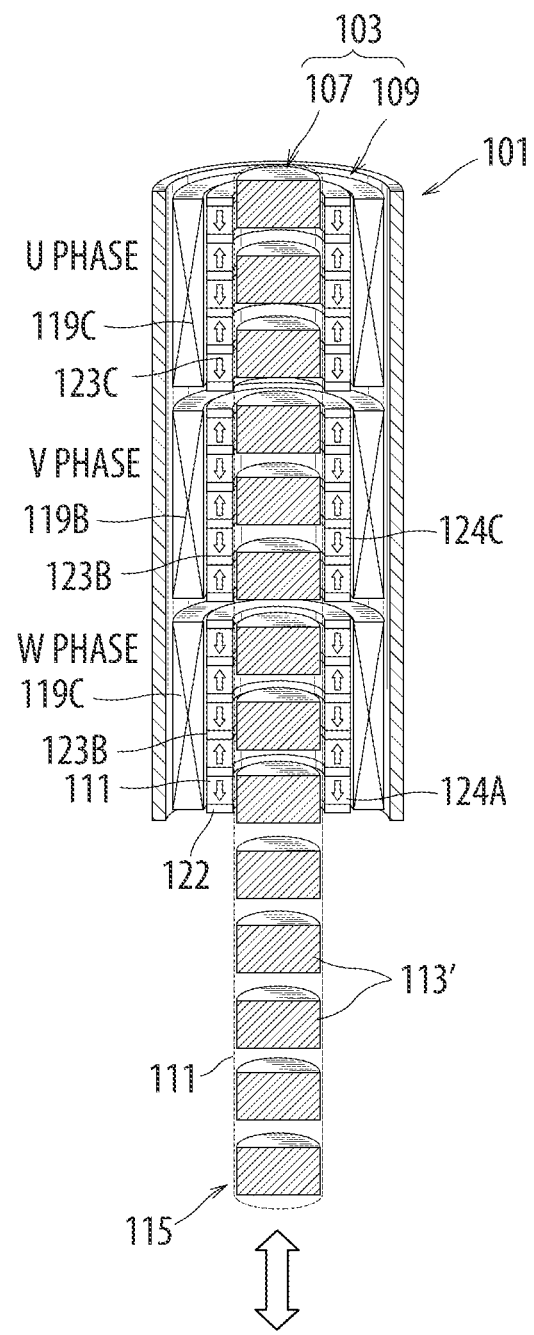

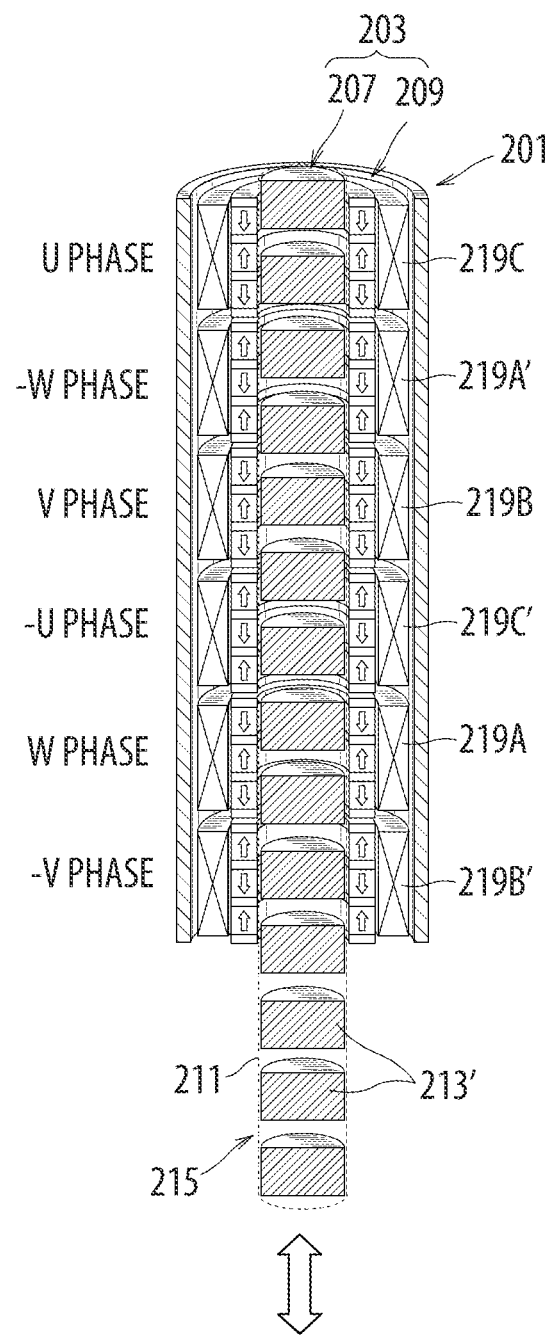

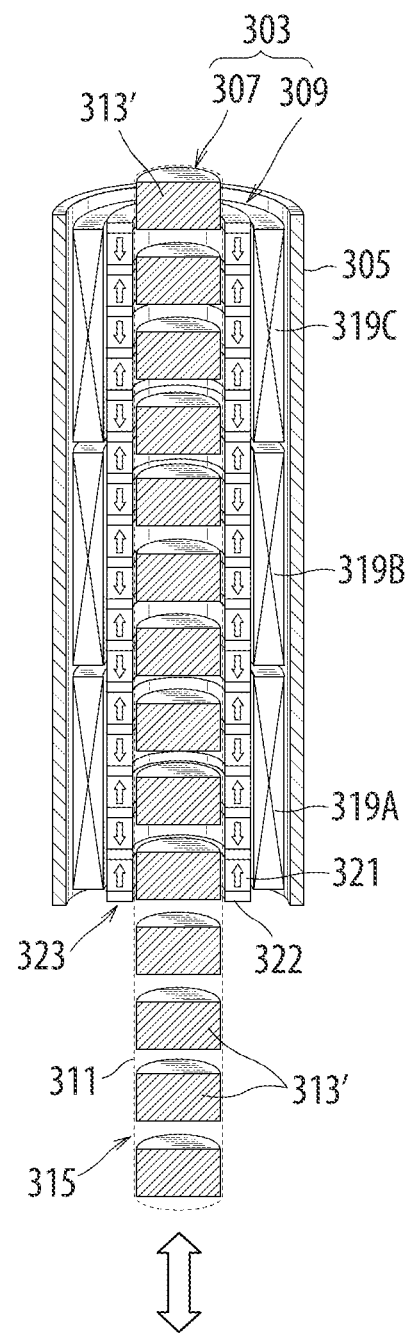

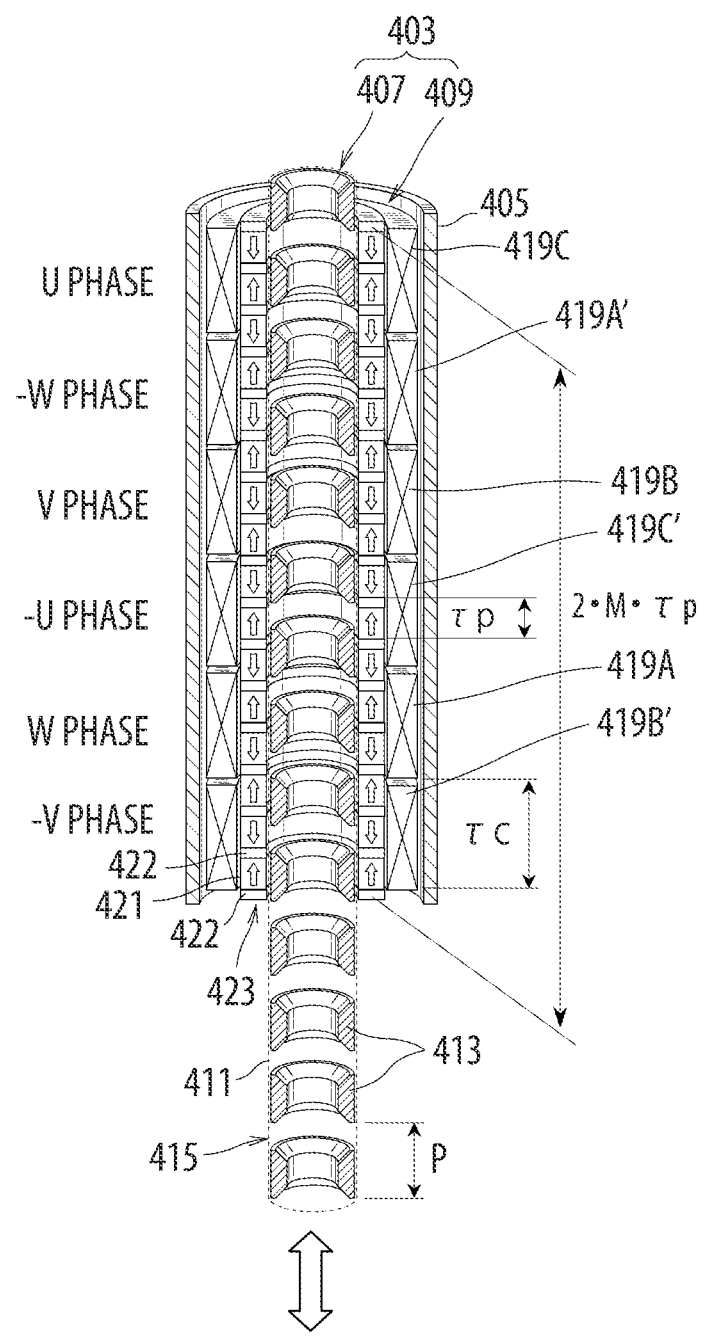

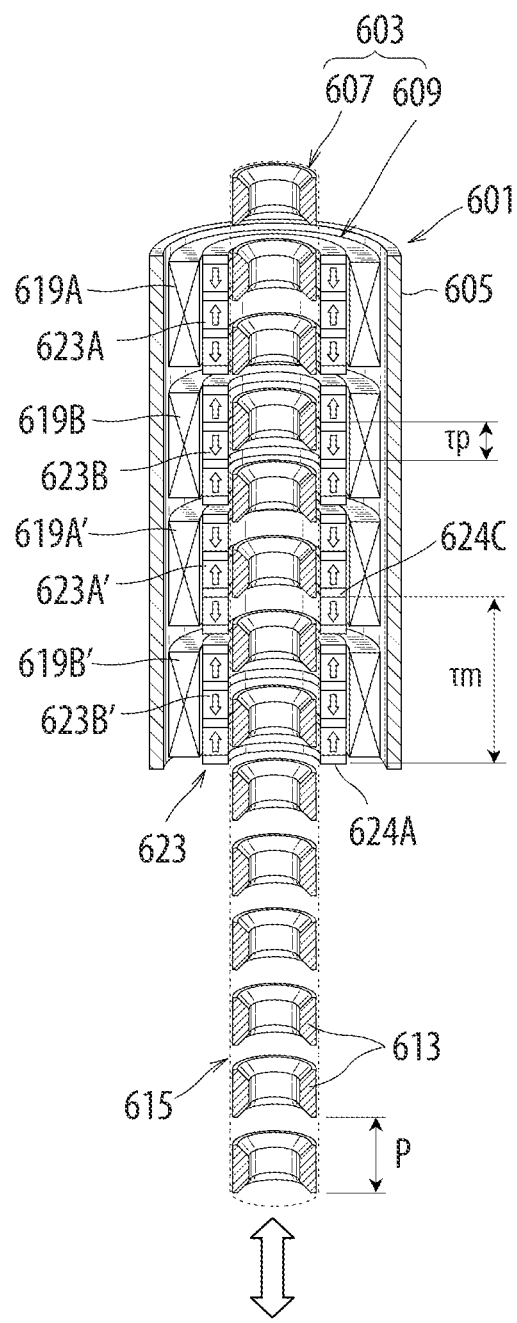

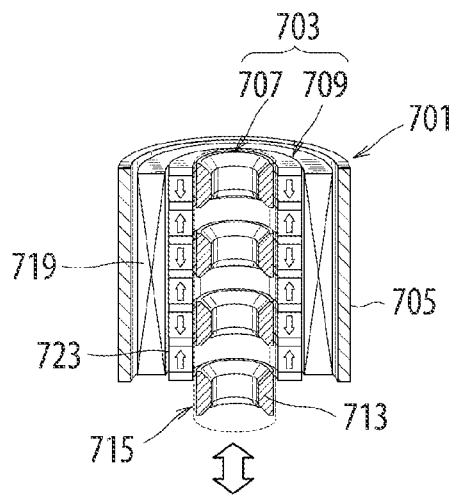
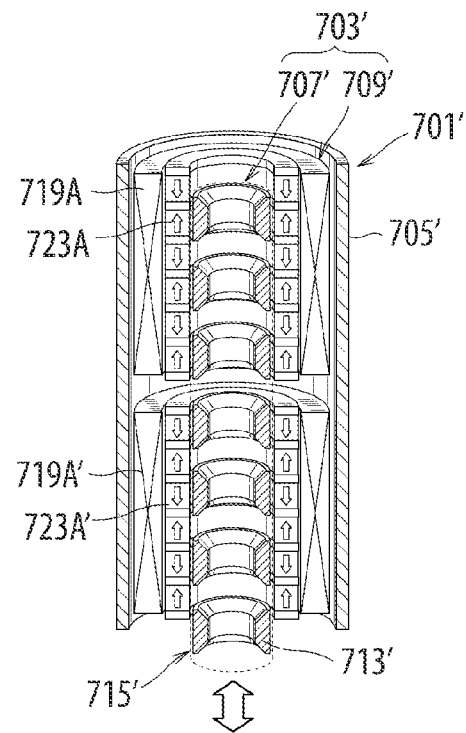

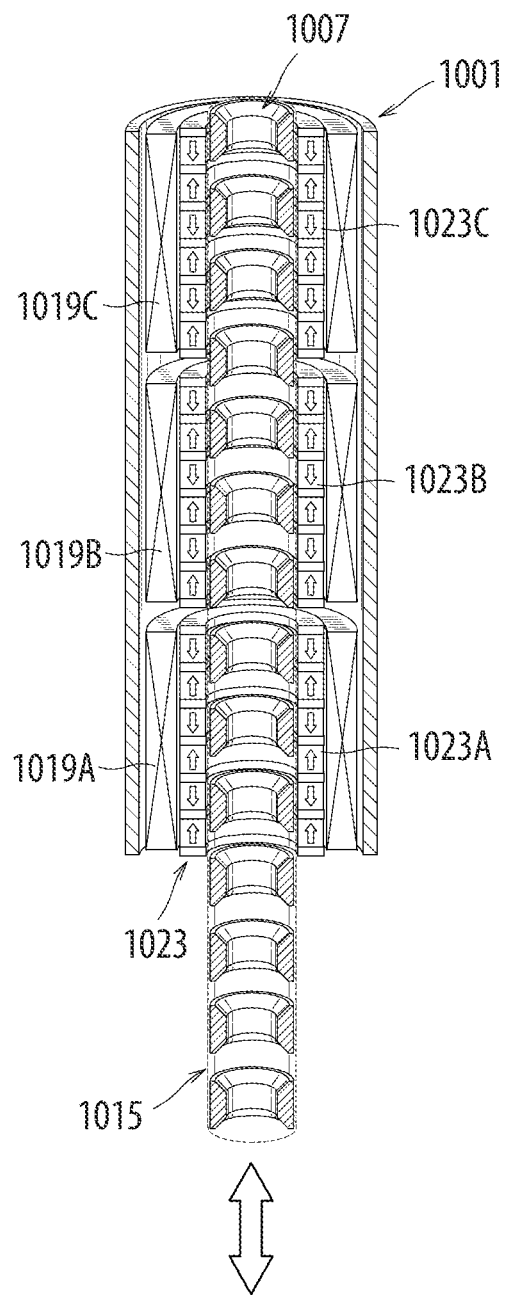

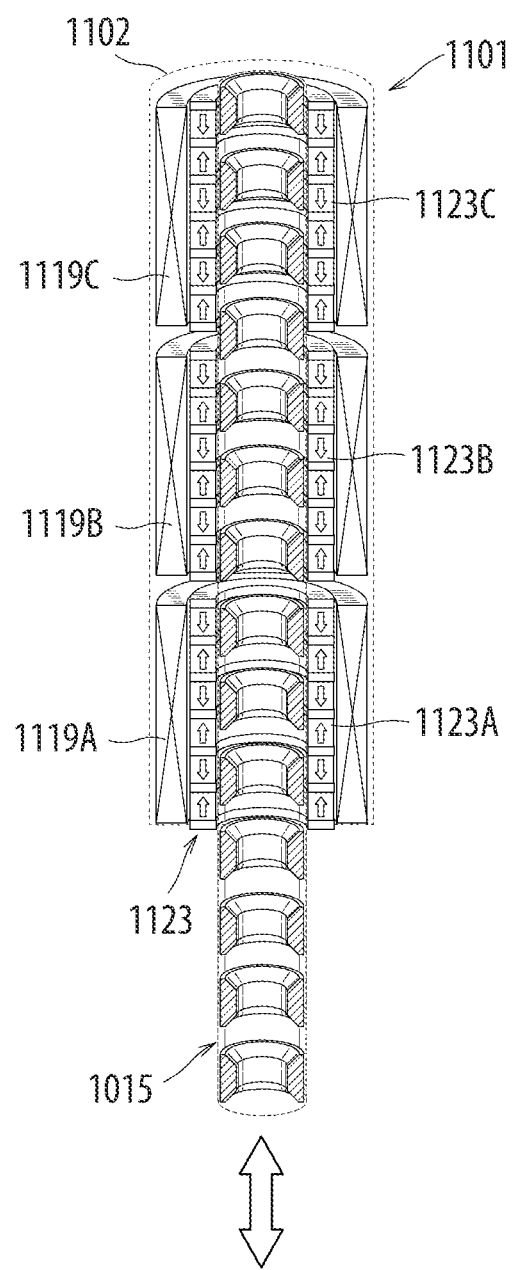

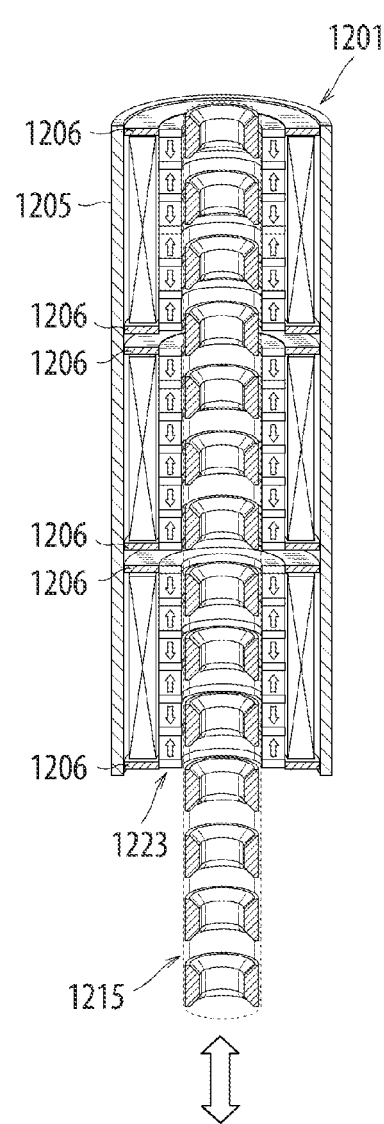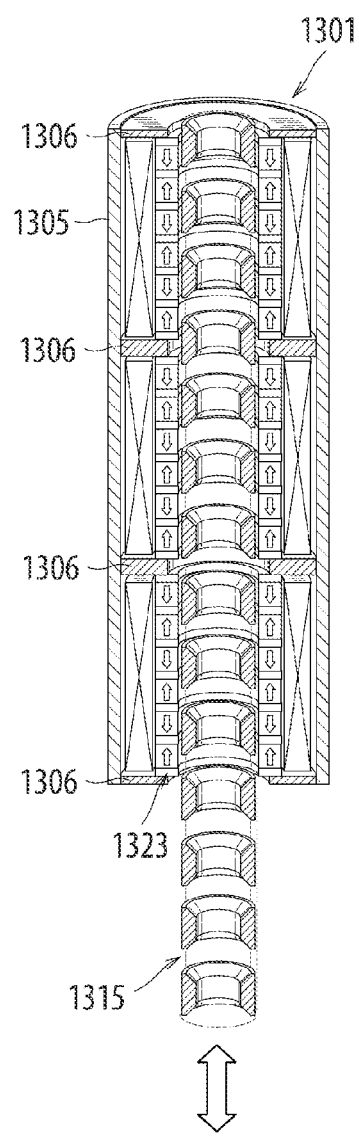

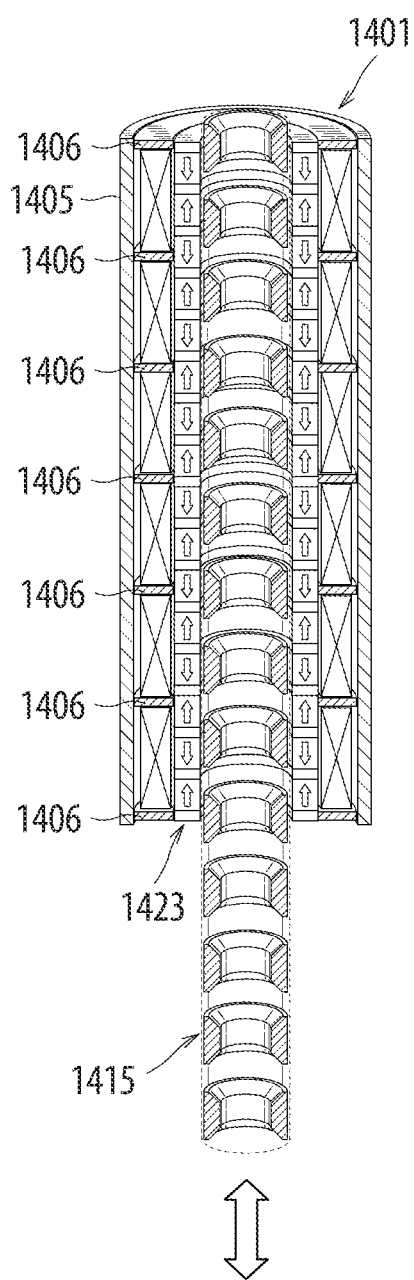

ELECTRIC MACHINE WITH LINEAR MOVER

BACKGROUND OF THE INVENTION

1. Field of the Invention

The present invention relates to an electric machine including a linear motor, a linear vibration actuator, and a linear vibration generator.

2. Description of the Related Art

WO 2009/028369 discloses an electric machine formed as a linear motor including a stator and a mover capable of reciprocal linear motion with respect to the stator. The mover of the linear motor includes a permanent magnet array including a plurality of permanent magnets arranged such that magnetic poles having the same polarity face each other. The stator of the linear motor includes winding portions formed by winding a winding conductor in a coil and concentrically disposed with the permanent magnet array. In the electric machine formed as this type of linear motor, it is proposed to increase the number of the winding portions and the permanent magnets, and the amount of the permanent magnets used, and to increase the size of the winding portions, in order to enhance thrust of the mover per unit volume.

SUMMARY OF THE INVENTION

However, increasing the number of the winding portions and the permanent magnets complicates manufacture, and increases the manufacturing cost.

An object of the present invention is to provide an electric machine that allows a reduction in number of winding portions and a reduction in number of permanent magnets or in amount of permanent magnet material used.

The present invention improves an electric machine including a stator and a mover capable of reciprocal linear motion with respect to the stator. In the present invention, one of the stator and the mover includes one or more permanent magnet arrays and one or more winding portions. The one or more permanent magnet arrays each include a plurality of permanent magnets arranged such that magnetic poles having the same polarity face each other, or each includes a plurality of discrete permanent magnet arrays each including a plurality of permanent magnets arranged such that magnetic poles having the same polarity face each other. The one or more winding portions is each formed by winding a winding conductor in a coil, and disposed to surround the one or more permanent magnet arrays. The discrete permanent magnet arrays are discretely provided in perfect correspondence with each of the winding portions. The other of the stator and the mover includes one or more magnetic pole piece arrays each including a plurality of magnetic pole pieces spaced along the permanent magnet array. The pitch of the plurality of permanent magnets and the pitch of the plurality of magnetic pole pieces are determined such that magnetic flux flows through two of the permanent magnets magnetized in the same direction and located in the permanent magnet array with one permanent magnet interposed between the two permanent magnets, and also flows through one or two of the magnetic pole pieces facing the one permanent magnet interposed between the two permanent magnets and magnetized in a direction of magnetization different from the direction of magnetization of the two permanent magnets.

In the electric machine which may be any of a linear motor, a linear vibration actuator, and a linear vibration generator and which includes the permanent magnet array and the magnetic pole piece array having the plurality of magnetic pole pieces configured according to the present invention, when magnetic flux flows through two of the permanent magnets magnetized in the same direction and located in the permanent magnet array with one permanent magnet interposed between the two permanent magnets, and also flows through one or two of the magnetic pole pieces facing the one permanent magnet interposed between the two permanent magnets and magnetized in a direction different from the direction of magnetization of the two permanent magnets, an attracting force is generated between magnetic poles formed in the plurality of magnetic pole pieces in the magnetic pole piece array and magnetic poles formed by permanent magnets disposed adjacent to the magnetic pole pieces, allowing enhancement of thrust of the mover. In addition, the permanent magnet array and the winding portions are disposed together in one of the stator and the mover. This facilitates assembly, and reduces the number of winding portions and permanent magnets.

The plurality of magnetic pole pieces are not limited in shape, and may each have a plate-like, columnar, or annular shape.

Magnetic yokes may be disposed on both polar sides of each of the plurality of permanent magnets. This makes it possible to efficiently enhance flow of magnetic flux, and to reduce a repulsive force generated when two permanent magnets are disposed such that the same polarities of the two permanent magnets are faced each other, facilitating manufacturing work.

The plurality of permanent magnets and the magnetic yokes may each have a cylindrical shape having a hollow portion extending in an extending direction of the permanent magnet array. This allows a reduction in amount of the permanent magnets and the magnetic yokes without significantly reducing thrust of the mover.

The permanent magnet array may be structured such that the plurality of permanent magnets are directly joined to each other. This allows an increase in amount of the permanent magnets and further enhancement of thrust of the mover of the electric machine.

Also in such a case, the plurality of permanent magnets may each have a cylindrical shape having a hollow portion extending in an extending direction of the permanent magnet array. This allows a reduction in amount of the permanent magnets used without significantly reducing thrust of the mover.

The plurality of magnetic pole pieces of the one or more magnetic pole piece arrays may be housed inside a cylindrical member made of a non-magnetic material. This allows the one or more magnetic pole piece arrays to be easily formed just by housing the plurality of magnetic pole pieces inside the cylindrical member.

If the electric machine is a linear vibration actuator, the one or more winding portions generate alternating magnetic flux to provide thrust to cause the mover to repeat the reciprocal linear motion between the permanent magnets and the magnetic pole pieces.

If the electric machine is a linear vibration generator, a voltage in the winding portions is induced by magnetic flux flowing through the plurality of permanent magnets of the permanent magnet array and the magnetic pole piece array when the reciprocal linear motion of the mover is caused by an external force.

If the electric machine is a linear motor, excitation currents with a phase difference of $(360/n)°$ or $(360/2n)°$ are supplied to the winding portions corresponding to n phases, n being an integer of 2 or more, to cause the reciprocal linear motion of the mover. If the electric machine is a two-phase motor, excitation currents with a phase difference of $(360/2n)°$ are supplied to the winding portions.

The winding portions corresponding to n phases may each be formed of a first divided winding portion and a second divided winding portion configured to have a phase opposite to that of the first split winding portion, n being an integer of 1 or more. In this case, the first and second divided winding portions of the n winding portions may be disposed such that excitation currents with a phase difference of $(360/(2n))°$ in terms of electrical angle are sequentially supplied to the first and second divided winding portions. Consequently, a magnetic field similar to that formed by winding portions for six phases can be formed by winding portions for three phases, for example. Thus, the number of excitation circuits can be reduced.

Specifically, if the number of phases is n, the relationship between the pitch of the permanent magnets and the pitch of the magnetic pole pieces may be determined as follows. That is, the pitch of the plurality of permanent magnets included in each discrete permanent magnet array provided for the winding portion corresponding to one phase is defined as $\tau p$. The pitch between an end surface of a first magnetic pole located on one end side of a first discrete permanent magnet array provided for the winding portion corresponding to one phase, and an end surface of a second magnetic pole located on one end side of a second discrete permanent magnet array provided for the winding portion corresponding to another phase and located on the other end side of the first discrete permanent magnet array, the first and second magnetic poles having the same polarity, is defined as $\tau m$. The pitch of the plurality of magnetic pole pieces included in each magnetic pole piece array is defined as $P=360°$ in terms of electrical angle. Then, the electric machine according to the present invention functions as a linear motor if the following conditions are met:

$$\tau m = q \times P \pm (1/n) \cdot P, q \text{ being a natural number; and}$$

$$\tau p = P/2.$$

In the conditions, the value of q is determined according to the configuration of the discrete permanent magnet arrays. The value "q" and the sign "±" in the formula for the pitch $\tau m$ are selectively determined according to the dimensions of the entire motor, the order of phases, the length of the permanent magnet array, etc., and selected to optimize the dimensions and thrust of the motor. In the first embodiment discussed later, the second magnetic pole is the magnetic pole located on one end side of the second discrete permanent magnet array, and the conditions are specifically defined as follows:

$$\tau m = q \times P + (1/n) \times P, q=3, n=3; \text{ and}$$

$$\tau p = P/2.$$

In the second embodiment discussed later, the second magnetic pole is the magnetic pole located in the second position from an end of the second discrete permanent magnet array located on the other end side of the first discrete permanent magnet array, and the conditions are specifically defined as follows:

$$\tau m = q \times P + (1/n) \times P, q=3, n=3; \text{ and}$$

$$\tau p = P/2.$$

The n winding portions corresponding to n phases may each be formed of a first divided winding portion and a second divided winding portion configured to have a phase opposite to that of the first divided winding portion, and the first and second divided winding portions of each of the n winding portions may be disposed such that excitation currents with a phase difference of $(360/(2n))°$ in terms of electrical angle are sequentially supplied to the first and second divided winding portions. That is, the pitch of the plurality of permanent magnets included in each discrete permanent magnet array provided for the divided winding portion of the winding portion corresponding to one phase is defined as $\tau p$. The pitch between an end surface of a first magnetic pole located on one end side of a first discrete permanent magnet array provided for the winding portion corresponding to one phase, and an end surface of a second magnetic pole located on one end side of a second discrete permanent magnet array provided for the winding portion corresponding to another phase and located on the other end side of the first discrete permanent magnet array, the first and second magnetic poles having the same polarity, is defined as $\tau m$. The pitch of the plurality of magnetic pole pieces included in each magnetic pole piece array is defined as $P=360°$ in terms of electrical angle. Then, the electric machine according to the present invention functions as a linear motor if the following conditions are met:

$$\tau m = q \times P \pm (1/(2 \times n)) \times P; \text{ and}$$

$$\tau p = P/2.$$

In the conditions given above, the value "q" and the sign "±" are selectively determined according to the dimensions of the entire motor, the order of phases, the length of the permanent magnet array, etc., and selected to optimize the dimensions and thrust of the motor.

In the third embodiment (FIGS. 8 and 9) discussed later, the conditions are defined as follows:

$$\tau m = 2 \times P + (1/(2 \times 3)) \times P; \text{ and}$$

$$\tau p = P/2.$$

If the winding portions corresponding to n phases are used, the number of the plurality of permanent magnets included in each permanent magnet array is defined as $2 \times M$, M being a natural number, the pitch of the plurality of permanent magnets included in each permanent magnet array is defined as $\tau p$, $\tau p$ being constant, and the pitch of the plurality of magnetic pole pieces included in each magnetic pole piece array is defined as $P=360°$ in terms of electrical angle. Then, the electric machine according to the present invention functions as a linear motor if the length $\tau c$ of the winding portion corresponding to one phase and the pitch $\tau p$ of the permanent magnets meet the following conditions:

$$\tau c = 2 \times M \times \tau p/n; \text{ and}$$

$$\tau p = P/2 \pm P/(2 \times M).$$

In the conditions given above, the sign "±" is selectively determined according to the dimensions of the entire motor, the order of phases, the length of the permanent magnet array, etc., and selected to optimize the dimensions and thrust of the motor.

In the embodiment (FIGS. 10 and 11) discussed later, the conditions are defined as follows:

$$\tau c = 2 \times 8 \times \tau p/3; \text{ and}$$

$$\tau p = P/2 + P/(2 \times 8).$$

If the winding portions corresponding to n phases are used, n winding portions corresponding to n phases are each formed from a first divided winding portion and a second divided winding portion configured to have a phase opposite to that of the first divided winding portion, and the first and second divided winding portions of each of the n winding portions are disposed such that excitation currents with a phase difference of $(360/(2 \times n))°$ in terms of electrical angle are sequentially supplied to the first and second divided winding portions, the number of the plurality of permanent magnets included in each permanent magnet array is defined as $2 \times M$, M being a natural number, the pitch of the plurality of permanent magnets included in each permanent magnet array is defined as $\tau p$, $\tau p$ being constant, and the pitch of the plurality of magnetic pole pieces included in each magnetic pole piece array is defined as $P=360°$ in terms of electrical angle. Then, the electric machine functions as a linear motor if the following conditions are met. That is, the length $\tau c$ of each of the divided winding portions and the pitch $\tau p$ of the permanent magnets are required to meet the following conditions:

$\tau c = 2 \times M \times \tau p/(2 \times n)$; and $\tau p = P/2 \pm P/(2 \times M)$.

In the conditions given above, the sign "±" is selectively determined according to the dimensions of the entire motor, the order of phases, the length of the permanent magnet array, etc., and is selected to optimize the dimensions and thrust of the motor.

In the embodiment (FIG. 12) discussed later, the conditions are defined as follows:

$\tau c = 2 \times 8 \times \tau p/(2 \times 3)$; and $\tau p = P/2 \pm P/(2 \times 8)$.

If the winding portions corresponding to n phases are used, the pitch of the plurality of permanent magnets included in each discrete permanent magnet array provided for the winding portion corresponding to one phase is defined as $\tau p$. The pitch between an end surface of a first magnetic pole located on one end side of a first discrete permanent magnet array provided for the winding portion corresponding to one phase, and an end surface of a second magnetic pole located on one end side of a second discrete permanent magnet array provided for the winding portion corresponding to another phase and located on the other end side of the first discrete permanent magnet array, the first and second magnetic poles having the same polarity, is defined as $\tau m$. The pitch of the plurality of magnetic pole pieces included in each magnetic pole piece array is defined as $P=360°$ in terms of electrical angle. Then, the electric machine according to the present invention functions as a linear motor if the following conditions are met:

$\tau m = q \times P \pm (1/(2 \times n)) \times P$, q being a natural number; and $\tau p = P/2$.

In the conditions given above, the value "q" and the sign "±" are selectively determined according to the dimensions of the entire motor, the order of phases, the length of the permanent magnet array, etc., and is selected to optimize the dimensions and thrust of the motor.

In the embodiment (FIG. 13) discussed later, the conditions are defined as follows:

$\tau m = 3 \times P + (1/(2 \times 2)) \times P$; and $\tau p = P/2$.

If the n winding portions corresponding to n phases are each formed of a first divided winding portion and a second divided winding portion configured to have a phase opposite to that of the first divided winding portion, and the first and second divided winding portions of each of the n winding portions are disposed such that excitation currents with a phase difference of $(360/(2 \times n))°$ in terms of electrical angle are sequentially supplied to the first and second divided winding portions, the following conditions are met. That is, the pitch of the plurality of permanent magnets included in each discrete permanent magnet array provided for the divided winding portion of the winding portion corresponding to one phase is defined as $\tau p$. The pitch between an end surface of a first magnetic pole located on one end side of a first discrete permanent magnet array provided for the winding portion corresponding to one phase, and an end surface of a second magnetic pole located on one end side of a second discrete permanent magnet array provided for the winding portion corresponding to another phase and located on the other end side of the first discrete permanent magnet array, the first and second magnetic poles having the same polarity, is defined as $\tau m$, the second magnetic pole being a magnetic pole located in the second position from an end of the second discrete permanent magnet array located on the other end side of the first discrete permanent magnet array. The pitch of the plurality of magnetic pole pieces included in each magnetic pole piece array is defined as $P=360°$ in terms of electrical angle. Then, the electric machine according to the present invention functions as a linear motor if the following conditions are met:

$\tau m = q \times P \pm (1/(2 \times n)) \times P$, q being a natural number; and $\tau p = P/2$.

In the conditions given above, the value "q" and the sign "±" are selectively determined according to the dimensions of the entire motor, the order of phases, the length of the permanent magnet array, etc., and is selected to optimize the dimensions and thrust of the motor.

In the embodiment (FIG. 14) discussed later, the conditions are defined as follows:

$\tau m = 2 \times P + (1/(2 \times 2)) \times p$; and $\tau p = P/2$.

The electric machine may further include a back yoke provided outside the n winding portions to form a part of a magnetic circuit. This allows a magnetic circuit to be positively formed outside the plurality of winding portions, allowing enhancement of thrust of the mover.

The electric machine may further include a bearing fixed at each of both ends of the back yoke in the extending direction of the permanent magnet array to support the mover such that the mover is capable of the reciprocal linear motion but is not rotatable in a circumferential direction of the mover. This makes it possible to prevent the mover from rotating in the circumferential direction.

The electric machine may further include a magnetic tooth provided at each of both ends of the plurality of winding portions, or each of both ends of each of the plurality of divided winding portions, to face the magnetic pole piece array, the magnetic tooth being magnetically coupled to the back yoke. Providing such a magnetic tooth allows enhancement of thrust of the mover.

The permanent magnets may each be formed by assembling a plurality of divided permanent magnets. If the permanent magnets are each formed by assembling a plurality of divided permanent magnets, permanent magnets having a variety of shapes can be inexpensively formed.

The stator may include the one or more magnetic pole piece arrays, and the mover may include the one or more winding portions and the one or more permanent magnet arrays. This configuration advantageously eliminates the need to increase the number of winding portions and the number of permanent magnets even if the stroke of the mover is increased.

The magnetic pole pieces are not limited in configuration, and may each be formed by stacking magnetic steel sheets in an extending direction of the permanent magnet array, or the plurality of magnetic pole pieces may be formed by stacking magnetic steel sheets.

One winding portion may be provided, and an alternating current may be supplied to the one winding portion to cause the mover to reciprocally vibrate, thereby forming a linear vibration actuator. Alternatively, two winding portions may be disposed side by side in an extending direction of the mover, and alternating currents having opposite phases may be supplied to the two winding portions to cause the mover to reciprocally vibrate. In this case, the condition $P/4<\tau p<P$ is preferably met, where $\tau p$ denotes the pitch of the plurality of permanent magnets, and P denotes the pitch of the plurality of magnetic pole pieces.

Further, each permanent magnet array may be configured to reciprocally move by means of an external force such that an alternating voltage is induced in each of the one or more winding portions, thereby obtaining a linear vibration generator. Also in this case, the condition $P/4<\tau p<P$ is preferably met, where $\tau p$ denotes the pitch of the plurality of permanent magnets, and P denotes the pitch of the plurality of magnetic pole pieces.

BRIEF DESCRIPTION OF THE DRAWINGS

FIG. 3 illustrates operation of the linear motor shown in FIG. 1.

FIG. 7 is a vertical cross-sectional view, as seen from an oblique angle, of a linear motor according to an embodiment in which the configuration of a magnetic pole piece array is changed from that in the linear motor shown in FIG. 6.

FIG. 9 is a vertical cross-sectional view, as seen from an oblique angle, of a linear motor according to an embodiment in which the configuration of a magnetic pole piece array is changed from that in the linear motor shown in FIG. 8.

FIG. 11 is a vertical cross-sectional view, as seen from an oblique angle, of a linear motor according to an embodiment in which the configuration of a magnetic pole piece array is changed from that in the linear motor shown in FIG. 10.

FIG. 12 is a vertical cross-sectional view of a linear motor according to another embodiment as seen from an oblique angle.

FIG. 14 is a vertical cross-sectional view, as seen from an oblique angle, of another embodiment in which the present invention is applied to a two-phase linear motor.

FIGS. 15A and 15B are each a vertical cross-sectional view, as seen from an oblique angle, of an embodiment in which the present invention is applied to a single-phase linear motor to form a linear vibration actuator.

FIGS. 16A to 16C are each a vertical cross-sectional view, as seen from an oblique angle, of an embodiment in which the present invention is applied to a linear vibration generator.

FIG. 17 is a cross-sectional view showing the structure of an electric machine according to an embodiment of the present invention having no back yoke.

FIGS. 18A to 18C each show the structure of an embodiment in which magnetic teeth are disposed on a back yoke in a configuration in which the electric machine according to the present invention is applied to a linear motor.

Figure 1:
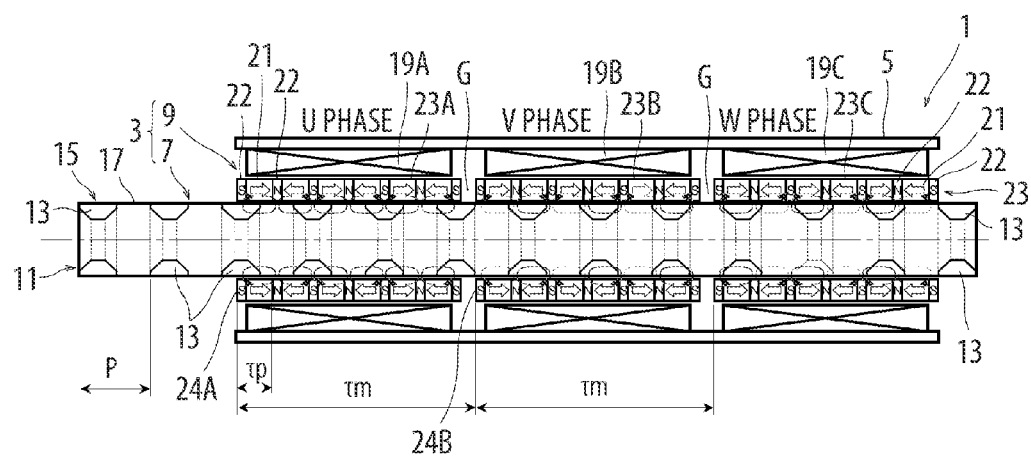
FIG. 1 is a cross-sectional view showing an embodiment of the present invention in which the present invention is applied to a three-phase linear motor, showing the linear motor in an unexcited and stationary state.

DESCRIPTION OF THE PREFERRED
EMBODIMENTS

Electric machines according to a plurality of embodiments of the present invention will be described in detail below with reference to the drawings. In the drawings referenced in the following description, in order to clarify illustration, cross sections are not hatched excluding some exceptions.

First Embodiment

Figure 2A:
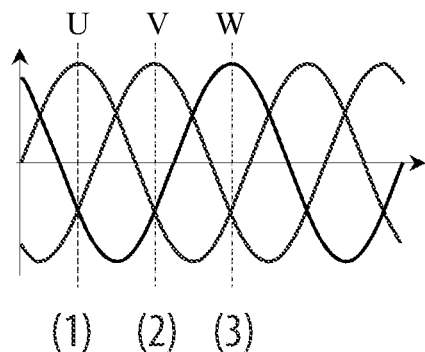
FIG. 2A shows three-phase alternating-current waveforms applied to winding portions.
Figure 2B:
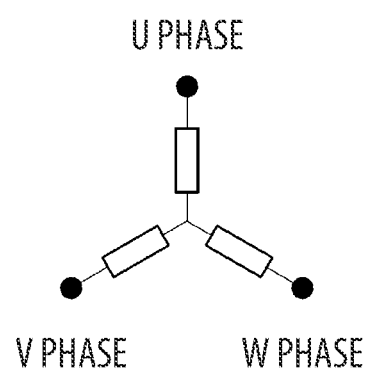
FIG. 2B shows the arrangement of the winding portions for three phases.
Figure 4A:
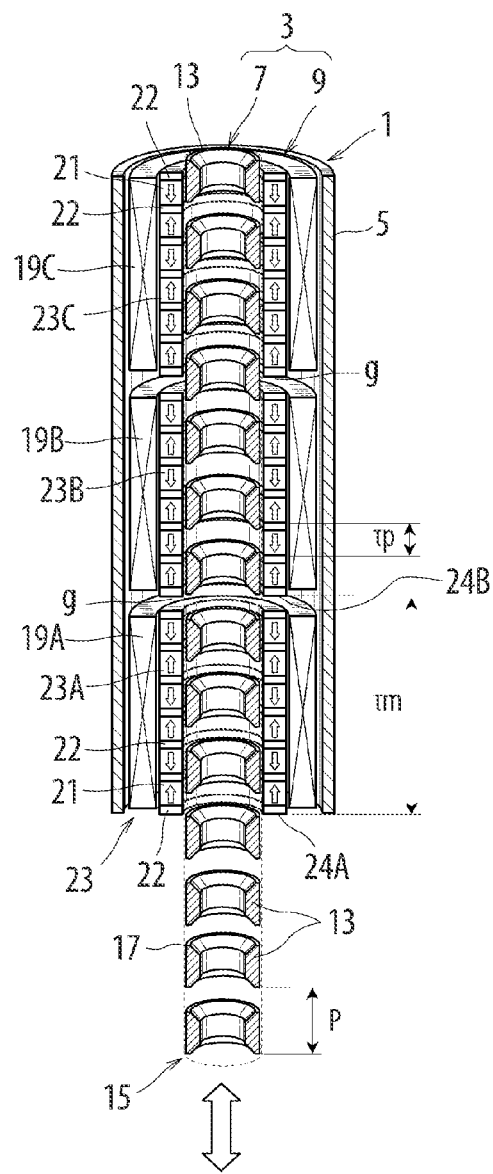
FIGS. 4A and 4B are a vertical cross-sectional view as seen from an oblique angle and a horizontal cross-sectional view, respectively, of the linear motor shown in FIG. 1.
Figure 4B:
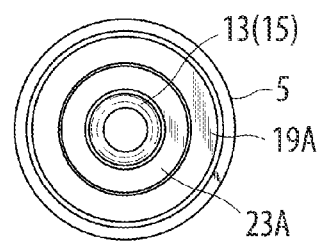

FIG. 1 is a schematic cross-sectional view of an electric machine according to a first embodiment of the present invention in which the present invention is applied to a three-phase linear motor. In FIG. 1, no bearing structure is shown. Three-phase alternating currents having a phase relationship shown in FIGS. 2A and 2B are applied to excitation windings of the three-phase linear motor. FIG. 1 shows a typical stationary state of a linear motion shaft in an unexcited state. As shown in FIG. 1, a three-phase linear motor 1 according to the embodiment includes a linear motor body 3 and a back yoke 5 attached to the linear motor body 3. The linear motor body 3 includes a mover 7 and a stator 9. The mover 7 includes a linear motion shaft 11. The linear motion shaft 11 includes one magnetic pole piece array 15 including a plurality of magnetic pole pieces 13. The magnetic pole pieces 13 used in the embodiment have an annular shape as shown in FIGS. 4A and 4B. The magnetic pole pieces 13 are formed from a magnetic material such as silicon steel, for example. In practice, the plurality of magnetic pole pieces 13 are provided inside a pipe 17 made of stainless steel and indicated by a broken or solid line, and disposed at a predetermined pitch P with a space between two adjacent magnetic pole pieces. A resin spacer (not shown) is disposed between adjacent magnetic pole pieces 13. In the embodiment, the pitch P of the magnetic pole pieces 13 corresponds to the sum of the length of each magnetic pole piece 13 in the axial direction and the length of each resin spacer in the axial direction (or the length of a space between two adjacent magnetic pole pieces 13). In the embodiment, the pitch of the magnetic pole pieces 13 is defined as 360° in terms of electrical angle. It is a matter of course that the magnetic pole piece array 15 may be formed as an integral component by insert molding using the plurality of magnetic pole pieces 13 as inserts. As described later, a ball spline bearing is provided at each of both ends of the linear motion shaft 11 to slidably support the linear motion shaft 11 such that the linear motion shaft 11 is capable of linear motion but is not rotatable.

The stator 9 includes three winding portions 19A, 19B, and 19C and a permanent magnet array 23 including a plurality of permanent magnets 21. The winding portions 19A to 19C are each formed by winding a winding conductor in a coil, and concentrically disposed with the permanent magnet array 23. Excitation currents with a phase difference of 120° ((360/n)°) in terms of electrical angle are supplied to the winding portions 19A to 19C. Currents for U phase, V phase, and W phase are supplied to the winding portions 19A to 19C, respectively.

The permanent magnet array 23 includes a plurality of cylindrical permanent magnets 21 and a plurality of cylindrical magnetic yokes 22 disposed on side surfaces of the plurality of permanent magnets 21. The permanent magnets 21 and the magnetic yokes 22 are arranged side by side at a predetermined pitch τp in the axial direction of the linear motion shaft 11.

In the embodiment, the pitch τp of the permanent magnets 21 in the permanent magnet array 23 corresponds to the sum of the thickness of permanent magnet 21 in the axial direction and the thickness of magnetic yoke 22 in the axial direction. The magnetic yokes 22 are formed from a magnetic material such as iron. For example, the magnetic yokes 22 may each be formed by stacking a plurality of magnetic steel sheets made of silicon steel in the axial direction. Carbon steel, ferrite-based stainless steel, a pressed powder magnetic core, etc., may also be used as the material of the magnetic yokes 22. The permanent magnet array 23 according to the embodiment includes three discrete permanent magnet arrays 23A to 23C each including a plurality of permanent magnets 21 arranged such that magnetic poles having the same polarity face each other. The three discrete permanent magnet arrays 23A to 23C are discretely provided in correspondence with the winding portions 19A to 19C, respectively. As shown in FIG. 4A, a magnetic gap g is formed between two adjacent discrete permanent magnet arrays 23A and 23B, and 23B and 23C. The gap g is determined such that the sum (electrical angle) of the axial length of the two magnetic yokes 22 located on both polar sides of the gap g in the axial direction and the size of the gap g in the axial direction corresponds to the pitch τp of the permanent magnets 21 discussed earlier. In the embodiment, in addition, one winding portion 19A and one discrete permanent magnet array 23A disposed inside the winding portion 19A are molded with a molding resin material. The winding portion 19A and discrete permanent magnet array 23A, the winding portion 19B and discrete permanent magnet array 23B, and the winding portion 19C and discrete permanent magnet array 23C are joined to the inner peripheral surface of the cylindrical back yoke 5 using joint means such as an adhesive or a molding resin material. The plurality of permanent magnets 21 forming the three discrete permanent magnet arrays 23A to 23C forming the permanent magnet array 23 are arranged such that magnetic poles having the same polarity face each other. In FIGS. 1, 3, and 4, arrows in the permanent magnets 21 indicate the direction of magnetization of the permanent magnets. In addition, thin arrows indicate the flow of magnetic flux.

The pitch τp of the plurality of permanent magnets 21 and the pitch P of the plurality of magnetic pole pieces 13 are determined such that magnetic flux flows through two of the permanent magnets 21 magnetized in the same direction and located in the permanent magnet array 23 with one permanent magnet 21 interposed between the two permanent magnets 21, and also flows through one or two of the magnetic pole pieces 13 facing the one permanent magnet 21 interposed between the two permanent magnets 21 and magnetized in a direction different from the direction of magnetization of the two permanent magnets 21.

If the number of phases is three as in the embodiment, the relationship between the pitch τp of the permanent magnets 21 and the pitch P of the magnetic pole pieces 13 may be determined as follows. That is, the pitch of the plurality of permanent magnets 21 included in each of the discrete permanent magnet arrays 23A to 23C provided for the winding portions 19A to 19C corresponding to three phases is defined as τp. The pitch (electrical angle) between an end surface of a first magnetic pole 24A located on one end side of a first discrete permanent magnet array 23A provided for the winding portion 19A corresponding to one phase, and an end surface of a second magnetic pole 24B located on one end side of a second discrete permanent magnet array 23B provided for the winding portion 19B corresponding to another phase and located on the other end side of the first discrete permanent magnet array 23A, the first and second magnetic poles 24A and 24B having the same polarity, is defined as τm, for example. One magnetic pole (24A, 24B) includes one permanent magnet 21 and one magnetic yoke 22 disposed adjacent to the one permanent magnet 21. The pitch of the plurality of magnetic pole pieces 13 included in the magnetic pole piece array 15 is defined as P=360° in terms of electrical angle. Then, the electric machine according to the present invention functions as a linear motor if the following conditions are met:

$$\tau m = q \times P \pm (1/3) \times P, q \text{ being a natural number; and}$$

$$\tau p = P/2.$$

The conditions can be generalized for n phases as follows:

$$\tau m = q \times P \pm (1/n) \times P, q \text{ being a natural number; and}$$

$$\tau p = P/2.$$

In the conditions given above, the value "q" and the sign "±" are selectively determined according to the dimensions of the entire motor, the order of phases, the length of the permanent magnet array, etc., and selected to optimize the dimensions and thrust of the motor.

In the embodiment, the second magnetic pole discussed earlier is the magnetic pole 24B located on one end side of the second discrete permanent magnet array 23B, which derives τm=3×P+(1/3)×P with q=3 and n=3. In the embodiment, a value of 3 is used for q to select an optimum value of q that maximizes thrust without increasing the number of coils when the overall length of the motor is restricted as in the embodiment.

Next, the principle of reciprocal linear motion of the mover 7 with respect to the stator 9 in the linear motor 1 according to the embodiment will be described. FIG. 2A shows the waveforms for the phases of the winding portions 19A to 19C (U phase, V phase, W phase), and (1) to (3) of FIG. 3 show the positional relationship between the mover 7 and the stator 9 at three points (1) to (3) indicated in FIG. 2A. When the winding portions 19A to 19C are excited at the point (1) indicated in FIG. 2A, magnetic flux (arrow A1) flows through the plurality of permanent magnets 21 and the plurality of magnetic pole pieces 13 in the U-phase area as shown in (1) of FIG. 3. At this time, strong attraction is generated in the U-phase area in which strong magnetic flux is generated. Thus, the permanent magnets 21 generate thrust to strongly pull the magnetic pole pieces 13 in this area, moving the mover 7 rightward in the drawing by (1/3)·P. Similarly, when the winding portions 19A to 19C are excited at the point (2) indicated in FIG. 2A, magnetic flux (arrow A2) flows through the plurality of permanent magnets 21 and the plurality of magnetic pole pieces 13 in the V-phase area as shown in (2) of FIG. 3. At this time, strong attraction is generated in the V-phase area in which strong magnetic flux is generated. Thus, the permanent magnets 21 generate thrust to strongly pull the magnetic pole pieces 13 in this area, further moving the mover 7 rightward in the drawing by (1/3)·P. Similarly, when the winding portions 19A to 19C are excited at the point (3) indicated in FIG. 2A, magnetic flux (arrow A3) flows through the plurality of permanent magnets 21 and the plurality of magnetic pole pieces 13 in the W-phase area as shown in (3) of FIG. 3. At this time, strong attraction is generated in the W-phase area in which strong magnetic flux is generated. Thus, the permanent magnets 21 generate thrust to strongly pull the magnetic pole pieces 13 in this area, further moving the mover 7 rightward in the drawing by (1/3)·P. In order to move the mover 7 in the opposite direction, the winding portions 19A to 19C (U phase, V phase, W phase) may be excited at phases advanced by 180°.

Figure 5A:
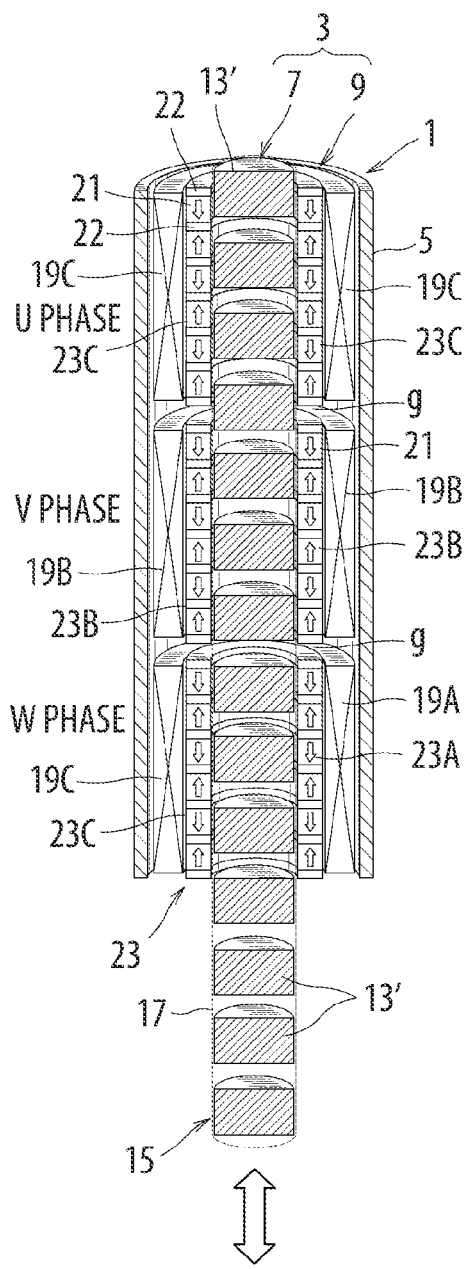
FIGS. 5A and 5B are a vertical cross-sectional view as seen from an oblique angle and a horizontal cross-sectional view, respectively, of a linear motor according to an embodiment in which the configuration of a magnetic pole piece array is changed from that in the linear motor shown in FIG. 1.
Figure 5B:
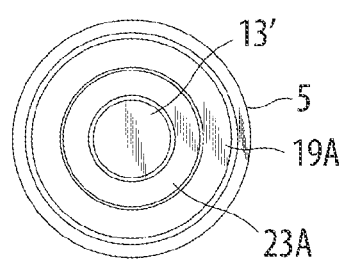

In the embodiment described above, the magnetic pole pieces 13 having an annular shape are used. However, magnetic pole pieces 13' having a columnar shape may also be used as shown in FIGS. 5A and 5B.

Second Embodiment

Figure 6:
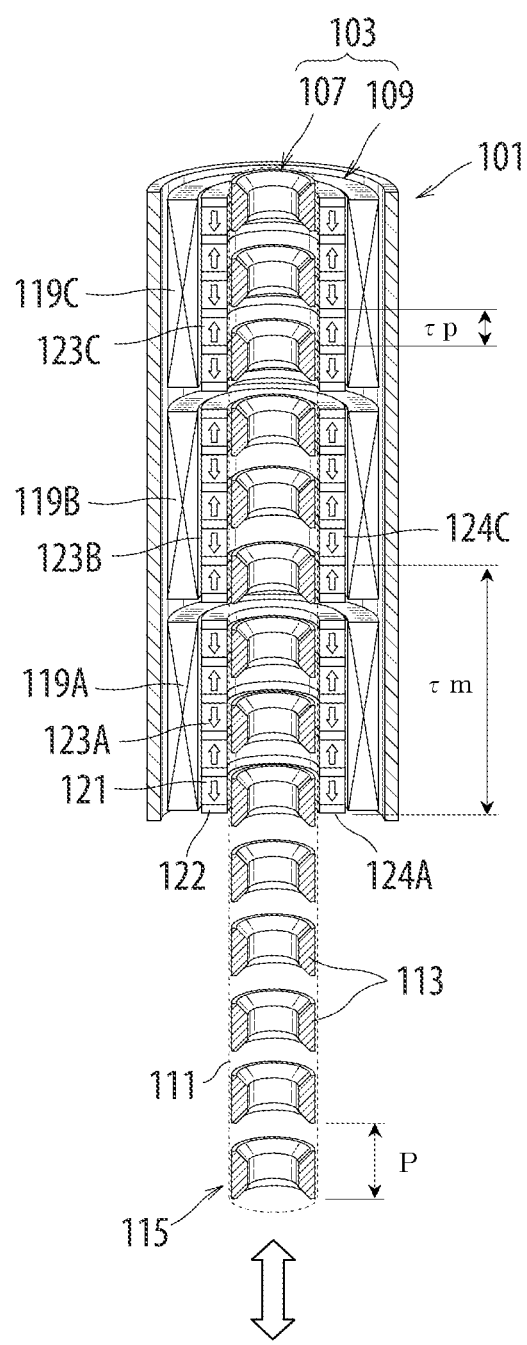
FIG. 6 is a vertical cross-sectional view, as seen from an oblique angle, of a linear motor according to an embodiment in which first magnetic poles in discrete permanent magnet arrays have different polarities.

In the embodiment described above, the first magnetic poles in all the discrete permanent magnet arrays 23A to 23C have the same polarity. However, the first magnetic poles in the discrete permanent magnet arrays may have different polarities. FIGS. 6 and 7 each show an embodiment in which first magnetic poles in discrete permanent magnet arrays 123A to 123C have different polarities. In the embodiment of FIG. 6, magnetic pole pieces 113 have an annular shape as in the embodiment of FIG. 4. In the embodiment of FIG. 7, magnetic pole pieces 113' have a columnar shape as in the embodiment of FIG. 5. The embodiments of FIGS. 6 and 7 are the same as the embodiments of FIGS. 4 and 5, respectively, except for the polarities of the discrete permanent magnet arrays 123A to 123C. Therefore, components of the embodiments shown in FIGS. 6 and 7 are denoted by reference numerals obtained by adding 100 to the reference numerals affixed to their counterparts of the embodiments shown in FIGS. 4 and 5 to omit description thereof. In the embodiments of FIGS. 6 and 7, the second magnetic pole in the second discrete permanent magnet array 123B, which has the same polarity as that of the first magnetic pole 124A in the first discrete permanent magnet array 123A, is the magnetic pole 124C located in the second position from an end of the second discrete permanent magnet array 123B located on the other end side of the first discrete permanent magnet array 123A. In this case, the pitch τm=q×P±(1/3)×P, q being a natural number, is converted into τm=3×P+(1/3)×P. In the embodiment, a value of 3 is used for q and a sign of + is used for ± to select an optimum value of q and an optimum sign that maximize thrust without increasing the number of coils when the overall length of the motor according to the embodiment is restricted.

Third Embodiment

Figure 8A:
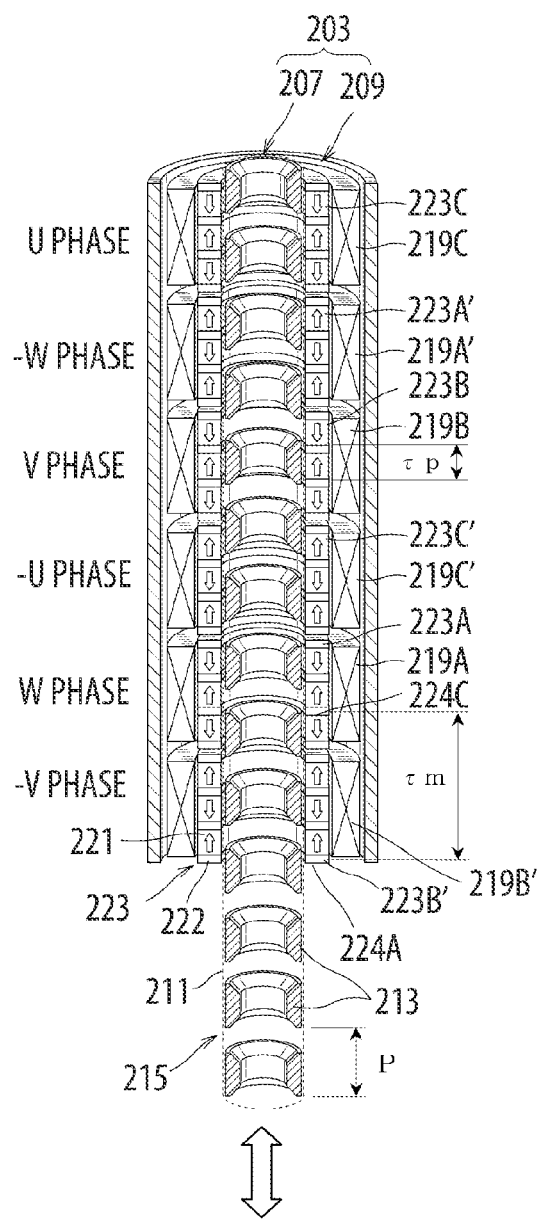
FIG. 8A is a vertical cross-sectional view of a linear motor according to another embodiment as seen from an oblique angle.
Figure 8B:
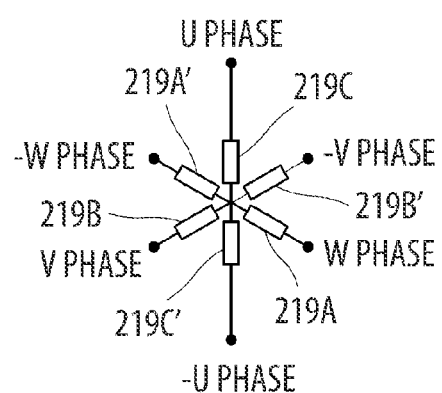
FIG. 8B shows the arrangement of winding portions.

FIG. 8A is a cross-sectional view showing another embodiment in which the present invention is applied to a linear motor. In the embodiment, components that are similar to those of the embodiment shown in FIGS. 4 and 5 are denoted by reference numerals obtained by adding 200 to the reference numerals affixed to their counterparts in FIGS. 4 and 5 to omit description thereof. In the embodiment, as shown in FIG. 8B, three winding portions corresponding to three phases are each formed from a first divided winding portion 219A to 219C and a second divided winding portion 219A' to 219C' configured to have a phase opposite to that of the first divided winding portion 219A to 219C. In addition, discrete permanent magnet arrays 223A to 223C and 223A' to 223C' are provided in correspondence with the divided winding portions 219A to 219C and 219A' to 219C' to form a permanent magnet array. In the embodiment, the first and second divided winding portions (219A to 219C and 219A' to 219C') of each of the three winding portions are disposed such that excitation currents with a phase difference of (360/6)° in terms of electrical angle are sequentially supplied to the first and second divided winding portions (219A to 219C and 219A' to 219C'). According to the embodiment, a magnetic field similar to that formed by winding portions for six phases can be formed by winding portions for three phases. Thus, the number of winding portions can be reduced. In the embodiment, the pitch of the plurality of permanent magnets 221 included in a discrete permanent magnet array 223B' provided for a divided winding portion 219B' of a winding portion corresponding to one phase is defined as τp, for example. The pitch between an end surface of a first magnetic pole 224A located on one end side of a first discrete permanent magnet array 223B' provided for the one divided winding portion 219B' corresponding to one phase, and an end surface of a second magnetic pole 224C located on one end side of a second discrete permanent magnet array 223A provided for the divided winding portion 219A corresponding to another phase and located on the other end side of the first discrete permanent magnet array 223B', the first and second magnetic poles 224A and 224C having the same polarity, is defined as τm. In the embodiment, the second magnetic pole is the magnetic pole 224C located in the second position from an end of the second discrete permanent magnet array 223A. The pitch of a plurality of magnetic pole pieces 213 included in a magnetic pole piece array 215 is defined as P=360° in terms of electrical angle. Then, the pitches (electrical angle) τm and τp discussed earlier may be determined as follows:

$$\tau m = 2 \times P + (\frac{1}{6}) \times P;\text{ and}$$

$$\tau p = P/2.$$

If winding portions corresponding to n phases are provided, the conditions described above can be generalized as follows:

$$\tau m = 2 \times P + (1/(2 \times n)) \times P;\text{ and}$$

$$\tau p = P/2.$$

The electric machine according to the embodiment functions as a linear motor if the conditions described above are met.

In the embodiment of FIG. 9, magnetic pole pieces 213' have a columnar shape as in the embodiment of FIG. 5. The embodiment of FIG. 9 is otherwise the same as the embodiment of FIG. 8A.

Fourth Embodiment

Figure 10:
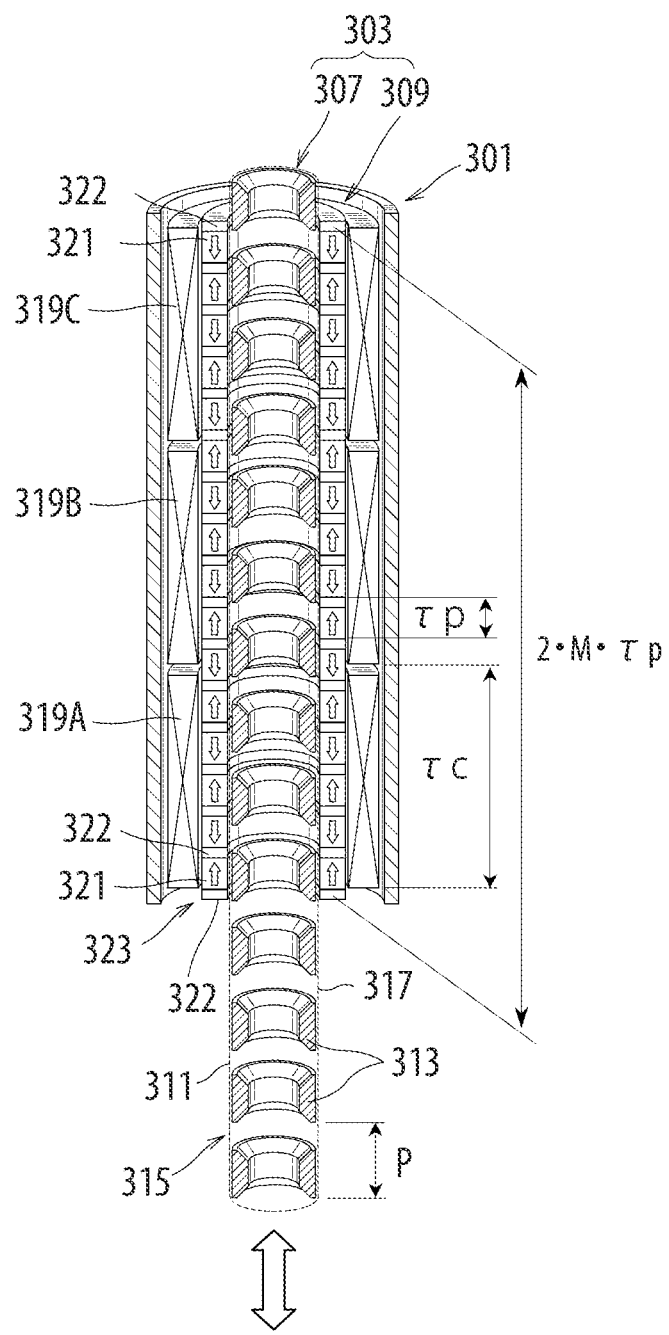
FIG. 10 is a vertical cross-sectional view, as seen from an oblique angle, of a linear motor according to an embodiment having a permanent magnet array including a plurality of permanent magnets arranged such that magnetic poles having the same polarity face each other.

In the embodiments described above, the permanent magnet array includes a plurality of discrete permanent magnet arrays provided in correspondence with winding portions. However, it is a matter of course that the permanent magnet array used in the present invention may include a plurality of permanent magnets arranged such that magnetic poles having the same polarity face each other. FIG. 10 shows an example of such an embodiment. In the embodiment, a permanent magnet array 323 includes a plurality of permanent magnets 321 arranged such that magnetic poles having the same polarity face each other. Components in FIG. 10 that are similar to those in the embodiment shown in FIG. 4 are denoted by reference numerals obtained by adding 300 to the reference numerals affixed to their counterparts in FIG. 4 to omit description of components that are common to the embodiment of FIG. 4 and the embodiment of FIG. 10.

In the embodiment, winding portions 319A to 319C corresponding to three phases are used. In this case, it is assumed that the number of the plurality of permanent magnets 321 included in the permanent magnet array 323 is 2×M, M being a natural number, the pitch of the plurality of permanent magnets 321 is defined as τp, τp being constant, and the pitch of a plurality of magnetic pole pieces 313 included in a magnetic pole piece array 315 is defined as P=360° in terms of electrical angle. Then, the linear motor according to the embodiment functions if the length (electrical angle) τc of the winding portion 319A corresponding to one phase and the pitch (electrical angle) τp of the permanent magnets 321 meet the following conditions:

$$\tau c = 2 \times M \times \tau p/n;\text{ and}$$

$$\tau p = P/2 \pm P/(2 \times M).$$

It should be noted that the conditions given above are defined with the proviso that winding portions corresponding to n phases are provided.

The conditions can be applied to the embodiment as follows:

$$\tau c = 2 \times 8 \times \tau p/3;\text{ and}$$

$$\tau p = P/2 + P/(2 \times 8).$$

According to the embodiment, thrust ripple and a cogging force can be advantageously reduced compared to the embodiment of FIG. 4.

In the embodiment of FIG. 11, magnetic pole pieces 313' have a columnar shape as in the embodiment of FIG. 5. The embodiment of FIG. 11 is otherwise the same as the embodiment of FIG. 10.

Fifth Embodiment

Also in the configuration in which a permanent magnet array includes a plurality of permanent magnets arranged such that magnetic poles having the same polarity face each other as in the embodiments of FIGS. 10 and 11, each winding portion may be divided into first and second divided winding portions as in the embodiment shown in FIG. 8A. In the embodiment of FIG. 12, three winding portions corresponding to three phases are each formed of a first divided winding portion 419A to 419C and a second divided winding portion 419A' to 419C' configured to have a phase opposite to that of the first divided winding portion 419A to 419C, and the first and second divided winding portions 419A to 419C and 419A' to 419C' of the three winding portions are disposed such that excitation currents with a phase difference of (360/6)° in terms of electrical angle are sequentially supplied to the first and second divided winding portions 419A to 419C and 419A' to 419C'. The configuration of FIG. 12 is otherwise the same as that of FIG. 10. Thus, components in FIG. 12 that are similar to those in the embodiment shown in FIG. 10 are denoted by reference numerals obtained by adding 100 to the reference numerals affixed to their counterparts in FIG. 10 to omit description of components that are common to the embodiment of FIG. 10 and the embodiment of FIG. 12. Also in this case, it is assumed that the number of a plurality of permanent magnets 423 included in a permanent magnet array 421 is 2×M, M being a natural number, the pitch of the plurality of permanent magnets 421 is defined as τp, τp being constant, and the pitch of a plurality of magnetic pole pieces 415 included in a magnetic pole piece array 413 is defined as P=360° in terms of electrical angle. Then, the electric machine according to the embodiment functions as a linear motor if the following conditions are met. That is, the length (electrical angle) τc of one discrete winding portion and the pitch (electrical angle) τp of the permanent magnets 421 are required to meet the following conditions:

$$\tau c = 2 \times M \times \tau p/(2 \times n);\text{ and}$$

$$\tau p = P/2 \pm P/(2 \times M).$$

It should be noted that the conditions given above are defined with the proviso that winding portions corresponding to n phases are provided.

The conditions can be applied to the embodiment as follows:

$$\tau c = 2 \times 8 \times \tau p/(2 \times 3); \text{ and}$$

$$\tau p = P/2 + P/(2 \times 8).$$

In the embodiment of FIG. 12, a value of 8 is used for M and a sign of + is used for ± to select an optimum value of M and an optimum sign that maximize thrust without increasing the number of coils when the overall length of the motor according to the embodiment is restricted. According to the embodiment, thrust ripple and a cogging force can be advantageously reduced. Also in the configuration in which magnetic pole pieces have a columnar shape, as a matter of course, each winding portion may be divided into first and second divided winding portions as in the embodiment.

Sixth Embodiment

Figure 13A:
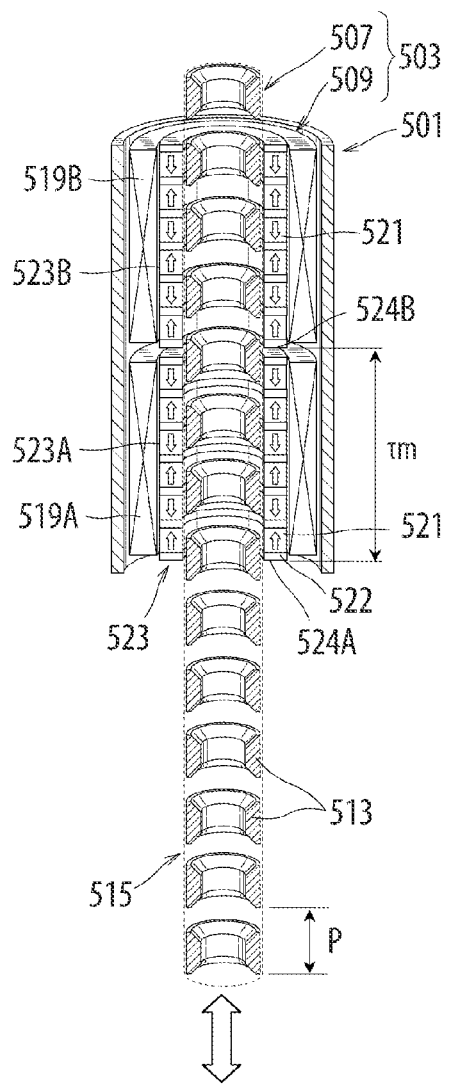
FIG. 13A is a vertical cross-sectional view, as seen from an oblique angle, of an embodiment in which the present invention is applied to a two-phase linear motor.
Figure 13B:
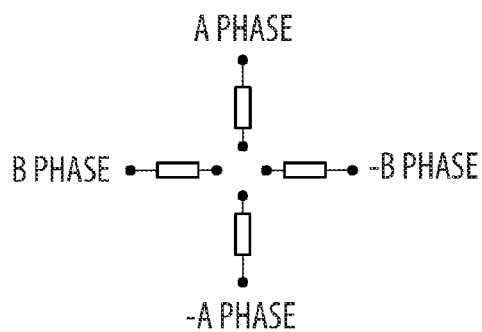
FIG. 13B shows the arrangement of winding portions.

FIG. 13 shows an embodiment in which the present invention is applied to a two-phase linear motor. The embodiment is the same in basic configuration as the three-phase linear motor shown in FIG. 4 except for having one less phase. Therefore, members in FIG. 13 that are similar to those shown in FIG. 4 are denoted by reference numerals obtained by adding 500 to the reference numerals affixed to their counterparts in FIG. 4 to omit description thereof. Also in the configuration in which winding portions 519A and 519B corresponding to two phases are used as in the embodiment, the pitch (electrical angle) of a plurality of permanent magnets 521 included in each of discrete permanent magnet arrays 523A and 523B provided for the winding portion corresponding to one phase is defined as $\tau p$. The pitch (electrical angle) between an end surface of a first magnetic pole 524A located on one end side of a first discrete permanent magnet array 523A provided for the winding portion 519A corresponding to one phase, and an end surface of a second magnetic pole 524B located on one end side of a second discrete permanent magnet array 523B provided for the winding portion 519B corresponding to the other phase and located on the other end side of the first discrete permanent magnet array 523A, the first and second magnetic poles 524A and 524B having the same polarity, is defined as $\tau m$. The pitch of a plurality of magnetic pole pieces 513 included in a magnetic pole piece array 515 is defined as $P = 360°$ in terms of electrical angle. Then, the linear motor according to the embodiment operates if the following general conditions are met:

$$\tau m = q \times P \pm (1/(2 \times n)) \times P, \ q \text{ being a natural number; and}$$

$$\tau p = P/2.$$

When the second magnetic pole is the magnetic pole 524B located on one end side of the second discrete permanent magnet array 523B as in the embodiment, q=3 and n=2 are derived, and the conditions described above are defined as follows:

$$\tau m = 3 \times P + (1/(2 \times 2)) \times p; \text{ and}$$

$$\tau p = P/2.$$

In the conditions described above, the value of q is determined according to the configuration of the discrete permanent magnet arrays. In addition, the sign "±" in the formula for the pitch $\tau m$ is selectively determined according to the dimensions of the entire motor, the order of phases, the length of the permanent magnet array, etc., and selected to optimize the dimensions and thrust of the motor.

In the embodiment of FIG. 14, as in the embodiment shown in FIG. 8, two winding portions are each formed from a first divided winding portion 619A and 619B and a second divided winding portion 619A' and 619B' configured to have a phase opposite to that of the first divided winding portion 619A and 619B. In addition, discrete permanent magnet arrays 623A and 623B and 623A' and 623B' are provided in correspondence with the divided winding portions 619A and 619B and 619A' and 619B' to form a permanent magnet array 623. In the embodiment, the first and second divided winding portions (619A and 619B and 619A' and 619B') of each of the two winding portions are disposed such that excitation currents with a phase difference of (360/4)° in terms of electrical angle are sequentially supplied to the first and second divided winding portions (619A and 619B and 619A' and 619B'). According to the embodiment, a magnetic field similar to that formed by winding portions for four phases can be formed by winding portions for two phases. Thus, the number of winding portions can be reduced. In the embodiment, the pitch of the plurality of permanent magnets 621 included in a discrete permanent magnet array 623B' provided for a divided winding portion 619B' of a winding portion corresponding to one phase is defined as $\tau p$, for example. The pitch between an end surface of a first magnetic pole 624A located on one end side of a first discrete permanent magnet array 623B' provided for the divided winding portion 619B' corresponding to one phase, and an end surface of a second magnetic pole 624C located on one end side of a second discrete permanent magnet array 623A' provided for the divided winding portion 619A' corresponding to the other phase and located on the other end side of the first discrete permanent magnet array 623B', the first and second magnetic poles 624A and 624C having the same polarity, is defined as $\tau m$. In the embodiment, the second magnetic pole is the magnetic pole 624C located in the second position from an end of the second discrete permanent magnet array 623A'. The pitch of a plurality of magnetic pole pieces 613 included in a magnetic pole piece array 615 is defined as $P = 360°$ in terms of electrical angle. Then, the pitches (electrical angle) $\tau m$ and $\tau p$ discussed earlier are determined to meet the following general conditions:

$$\tau m = q \times P \pm (1/(2 \times n)) \times p, \ q \text{ being a natural number; and}$$

$$\tau p = P/2.$$

In the embodiment, q=2 and n=2, which results in the following conditions:

$$\tau m = 2 \times P + (¼) \times P; \text{ and}$$

$$\tau p = P/2.$$

In the conditions described above, the value of q is determined according to the configuration of the discrete permanent magnet arrays. In addition, the sign "±" in the formula for the pitch $\tau m$ is selectively determined according to the dimensions of the entire motor, the order of phases, the length of the permanent magnet array, etc., and selected to optimize the dimensions and thrust of the motor.

The embodiments of FIGS. 13 and 14 enhance the degree of freedom in adapting the motor to a drive circuit.

Seventh Embodiment

FIGS. 15A and 15B each show an embodiment in which the present invention is applied to a single-phase linear motor to form a linear vibration actuator. The embodiments are the same in basic configuration as the two-phase linear motors shown in FIGS. 13 and 14 except for having one less phase.

Therefore, members in FIGS. 15A and 15B that are similar to those shown in FIGS. 13 and 14 are denoted by reference numerals obtained by adding 200 or 100 to the reference numerals affixed to their counterparts in FIGS. 13 and 14 to omit description thereof. In FIG. 15A, a permanent magnet array 723 is provided for a winding portion 719 corresponding to one phase. The pitch of the plurality of magnetic pole pieces 713 included in the magnetic pole piece array 715 is defined as P=360° in terms of electrical angle. Then, the pitch τp of permanent magnets may meet P/4<τp<P. The embodiment corresponds to a configuration with τp=P/2, at which thrust becomes maximum. If P/4<τp<P/2 or P/2<τp<P, smooth drive can be achieved with less cogging while suppressing a reduction in thrust.

In the embodiment of FIG. 15B, as in the embodiment shown in FIG. 14, one winding portion is formed from a first divided winding portion 719A and a second divided winding portion 719A' configured to have a phase opposite to that of the first divided winding portion 719A. Also in the embodiment, the pitch of the plurality of magnetic pole pieces 713' included in the magnetic pole piece array 715' is defined as P=360° in terms of electrical angle, and the pitch τp of permanent magnets meets P/4<τp<P. Then, a phase difference of 180° (=P/2) in terms of electrical angle is provided between the excitation currents flowing the first divided winding portion 719A and the second divided winding portion 719A. The embodiment corresponds to a configuration with τp=P/2, at which thrust becomes maximum. If P/4<τp<P/2 or P/2<τp<P, smooth drive can be achieved with less cogging while suppressing a reduction in thrust.

Eighth Embodiment

Figure 16A:
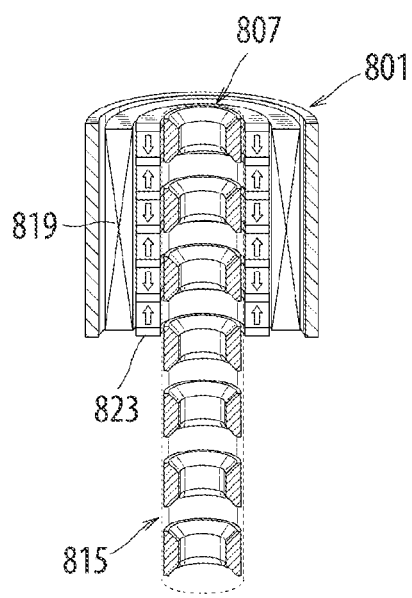
Figure 16B:
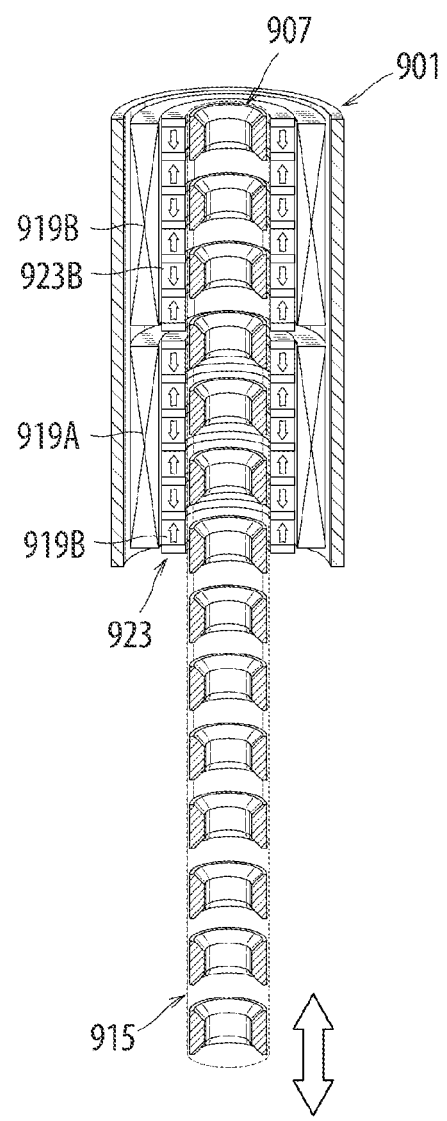

FIGS. 16A to 16C are each a perspective view showing an embodiment in which the present invention is applied to a linear vibration generator, shown in cross section. FIG. 16A shows the structure of a single-phase linear vibration generator. FIG. 16B shows the structure of a two-phase linear vibration generator. FIG. 16C shows the structure of a three-phase linear vibration generator. In the generators, when reciprocal linear motion of a mover 807, 907, 1007 is caused by an external force, magnetic flux emitted from a permanent magnet array 823, 923, 1023 passes through a magnetic pole piece array 815, 915, 1015 to flow through a magnetic path such as that shown in FIGS. 1 and 3 to induce a voltage in one or more winding portions.

Ninth Embodiment

FIG. 17 shows the structure of an electric machine according to an embodiment of the present invention having no back yoke. In the embodiment, no back yoke is provided, and winding portions 1119A to 1119C and discrete permanent magnet arrays 1123A to 1123C are integrated with each other by an insulating resin molded portion 1102. If no back yoke is provided, the weight of the electric machine can be reduced although thrust is reduced. In addition, the number of winding turns in the winding portions can be increased because of the absence of a back yoke, providing a high-efficiency motor.

Tenth Embodiment

FIGS. 18A to 18C each show the structure of an embodiment in which magnetic teeth 1206, 1306, 1406 are disposed on a back yoke 1205, 1305, 1405 in order to achieve improved thrust and an enhanced efficiency in a configuration in which the electric machine according to the present invention is applied to a linear motor. In the embodiments, the ring-shaped magnetic teeth 1206, 1306, 1406 are fixed to each of both ends of the winding portions, and magnetically and mechanically coupled to the back yoke 1205, 1305, 1405 at one end of the magnetic teeth 1206, 1306, 1406. The thus configured magnetic teeth 1206, 1306, 1406 function as magnetic poles.

Eleventh Embodiment

Figure 19A:
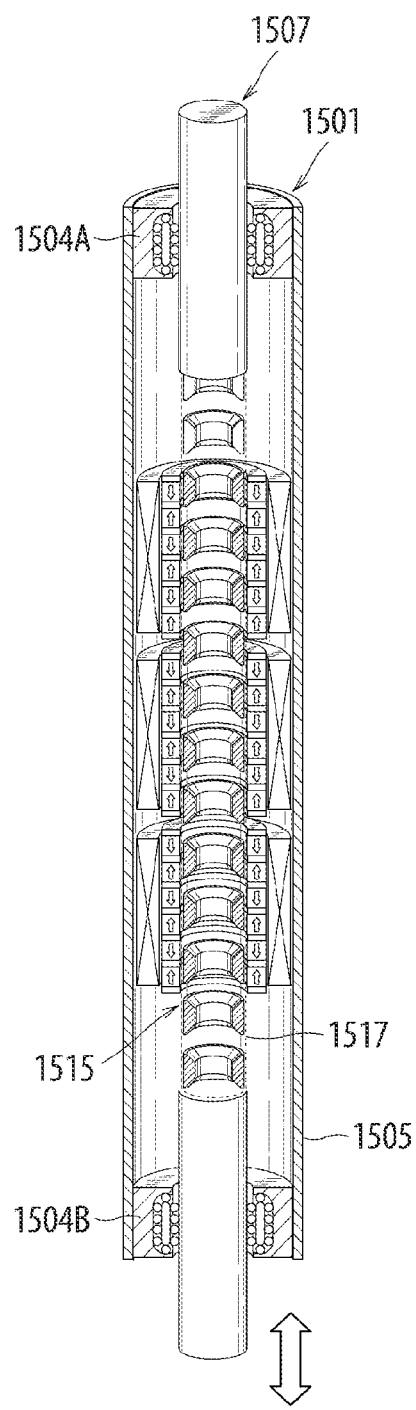
FIGS. 19A and 19B are each a cross-sectional view of an embodiment for illustrating the structure for fixing a mover.
Figure 19B:
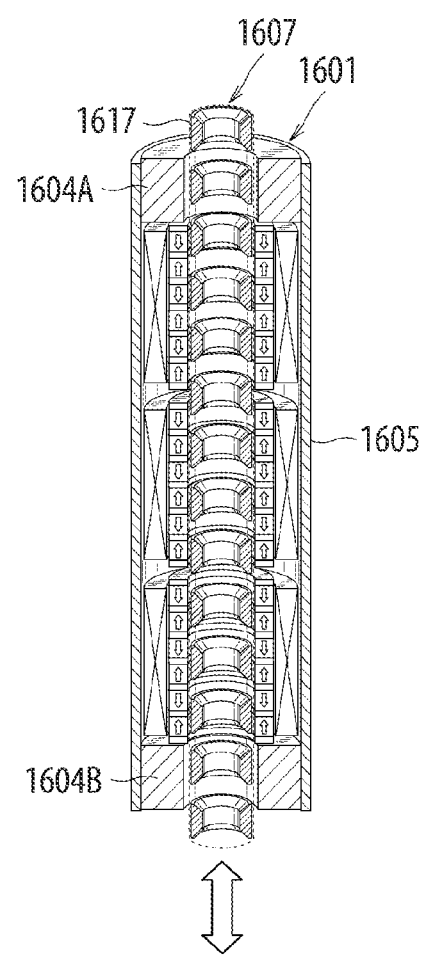
Figure 20A:
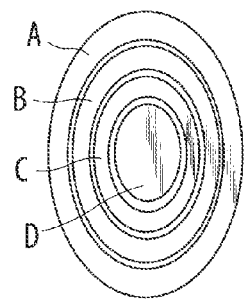
FIGS. 20A to 20D each illustrate a modification of the cross-sectional shape of an electric machine according to an embodiment as viewed in a direction orthogonal to the axial direction.
Figure 20B:
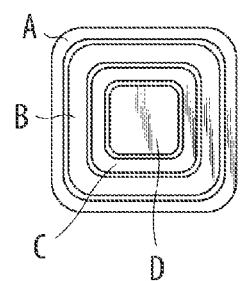
Figure 20C:
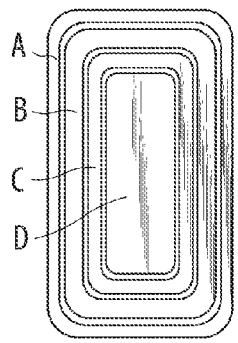
Figure 20D:
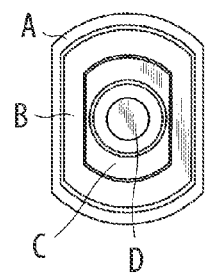

FIGS. 19A and 19B are each a cross-sectional view of an embodiment for illustrating the structure for fixing a mover. In the embodiment of FIG. 19A, both ends of a tube 1517 made of stainless steel and housing a magnetic pole piece array 1515 of a mover 1507 are extended, and supported by a pair of ball spline bearings 1504A and 1504B fitted with both ends of a casing formed from a back yoke 1505. Use of the pair of ball spline bearings 1504A and 1504B allows the mover 1507 to slide in the axial direction, but not to rotate about the axis. In the embodiment of FIG. 19B, a pair of friction bearings 1604A and 1604B are fitted with both ends of a casing formed from a back yoke 1605 to support a tube 1617 made of stainless steel to be slidable in the axial direction. A rotation prohibiting mechanism may be separately provided to prohibit rotation of a mover 1607.

The electric machines according to the embodiments described above have a circular cross section as viewed in a direction orthogonal to the axial direction. However, the electric machines may have a variety of cross-sectional shapes such as circular, square, rectangular, and flat shapes as shown in FIGS. 20A to 20D. In FIGS. 20A to 20D, A denotes a back yoke, B denotes winding portions, C denotes a permanent magnet array, and D denotes a magnetic pole piece array.

Figure 21A:
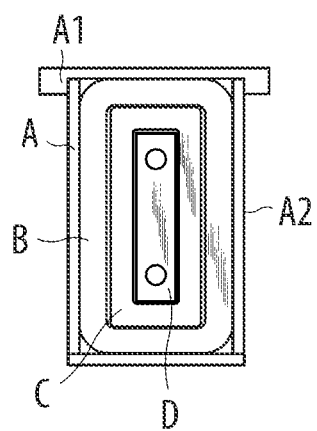
FIGS. 21A and 21B illustrate a modification of a back yoke, permanent magnets, and magnetic pole pieces.
Figure 21B:
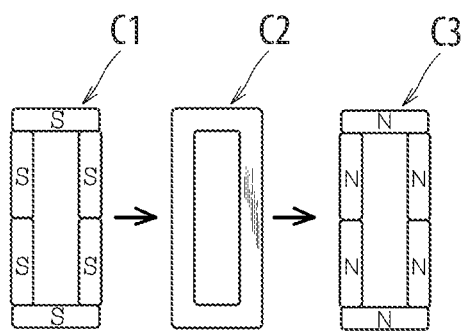
Figure 22A:
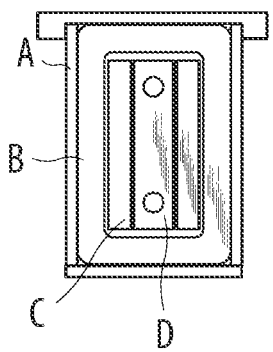
FIGS. 22A and 22B illustrate a modification of a back yoke, permanent magnets, and magnetic pole pieces.
Figure 22B:
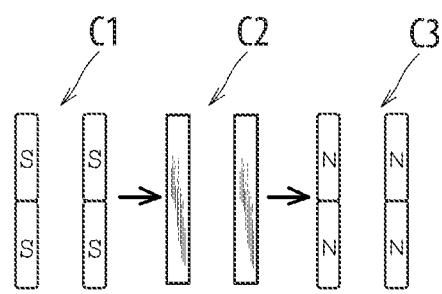

A back yoke, permanent magnets, and magnetic pole pieces are not necessarily integrally formed with each other. For example, the back yoke A may be structured by assembling two members A1 and A2 to each other as shown in FIG. 21A. In the example of FIG. 21A, adjacent permanent magnets C1 and C3 are each formed from four permanent magnet pieces as shown in FIG. 21B. C2 denotes a magnetic yoke located between the adjacent permanent magnets C1 and C3. In the example of FIG. 22A, adjacent permanent magnets C1 and C3 are each formed from two permanent magnet pieces arranged in parallel with each other as shown in FIG. 22B. C2 denotes two divided magnetic yokes located between the adjacent permanent magnets C1 and C3.

Figure 23:
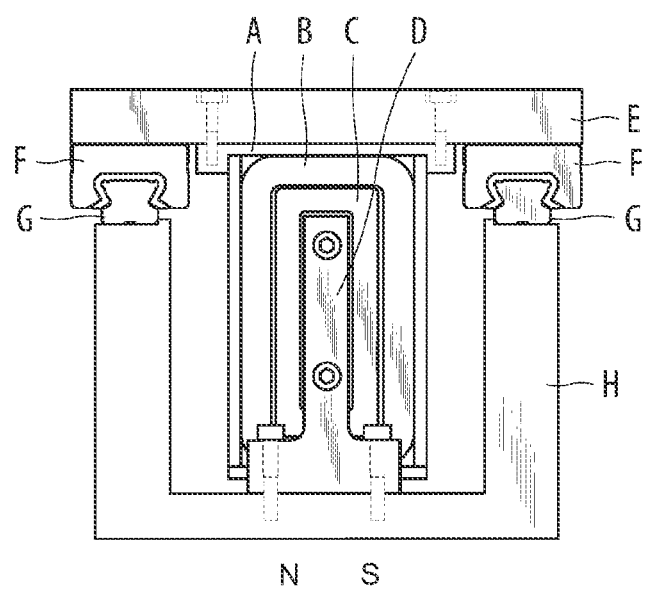
FIG. 23 shows an example of the configuration in which a stator includes a magnetic pole piece array and a mover includes a permanent magnet array and winding portions.
Figure 24:
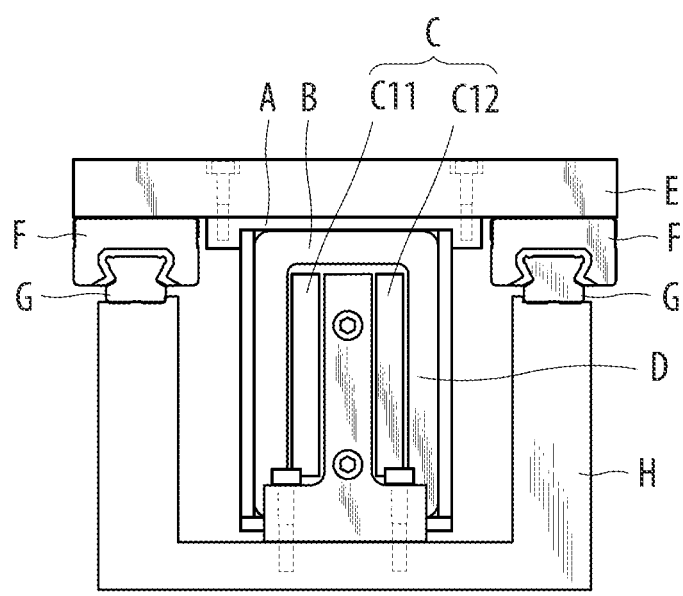
FIG. 24 shows another example of the configuration in which a stator includes a magnetic pole piece array and a mover includes a permanent magnet array and winding portions.
Figure 25A:
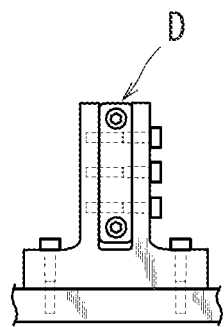
FIGS. 25A and 25B are a front view and a side view, respectively, of a structure including the magnetic pole piece array of the stator that may be used in the embodiments shown in FIGS. 23 and 24.
Figure 25B:
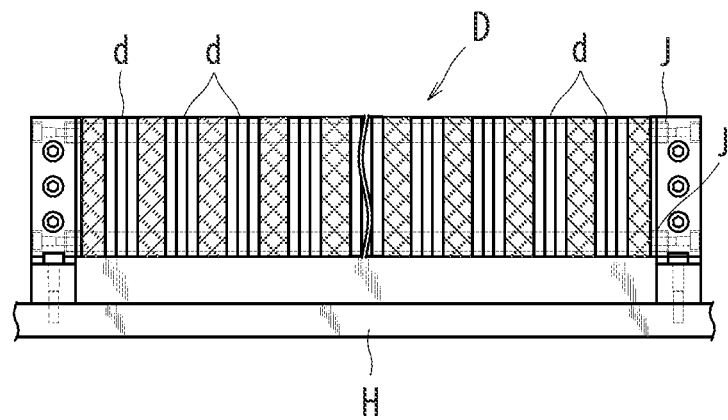
Figure 26A:
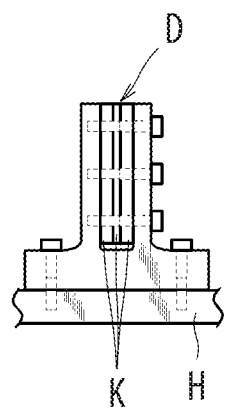
FIGS. 26A and 26B are a front view and a side view, respectively, of a structure including the magnetic pole piece array of the stator that may be used in the embodiments shown in FIGS. 23 and 24.
Figure 26B:
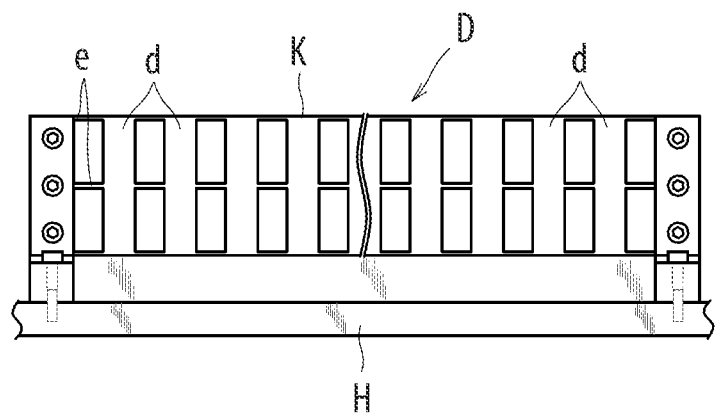
Figure 27A:
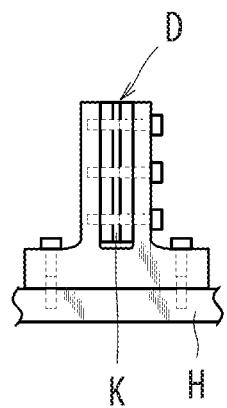
FIGS. 27A and 27B are a front view and a side view, respectively, of a structure including the magnetic pole piece array of the stator that may be used in the embodiments shown in FIGS. 23 and 24.
Figure 27B:
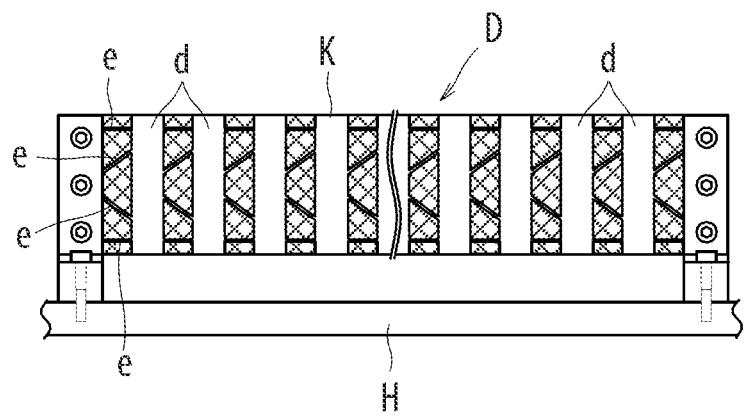

In the embodiments described above, the mover includes the one or more magnetic pole piece arrays, and the stator includes the one or more permanent magnet arrays and the one or more winding portions. However, the present invention may also be applied to a configuration in which the stator includes the one or more magnetic pole piece arrays and the mover includes the one or more permanent magnet arrays and the one or more winding portions as a matter of course. FIG. 23 shows an example of the configuration in which a stator includes a magnetic pole piece array D and a mover includes a permanent magnet array C and winding portions B. In the example, the stator includes a base H having a U-shaped cross section, and the magnetic pole piece array D is fixed to the center portion of the base H. Rails G are fixed on a pair of sidewall portions of the base H. A movable plate E is disposed on the rails G via guides F. A back yoke A is screwed to the back surface of the movable plate E. In the example, the permanent magnet array C has an annular horizontal cross-sectional shape, and the magnetic pole piece array D is disposed inside the annular permanent magnet array C. In the example of FIG. 24, as in the structure shown in FIG. 22, the permanent magnet array C is formed from two divided permanent magnet arrays C11 and C12. FIGS. 25A and 25B to FIGS. 27A and 27B are each a front view and aside view, respectively, of a structure including the magnetic pole piece array D of the stator that may be used in the embodiments shown in FIGS. 23 and 24. In the structure of FIGS. 25A and 25B, a plurality of magnetic pole pieces d are formed by stacking a plurality of magnetic steel sheets in the moving direction of the mover. The plurality of magnetic pole pieces d forming the magnetic pole piece array D are stacked with a plurality of non-magnetic members made from aluminum or the like interposed between the magnetic pole pieces d, and integrated by through shafts J. In the structure of FIGS. 26A and 26B, the magnetic pole piece array D is formed by stacking a plurality of punched magnetic sheets K integrally having portions for forming a plurality of magnetic pole pieces d. Coupling portions e that couple between adjacent magnetic pole pieces d are formed to be thin to have as small a horizontal cross section as possible in order to provide a large magnetic resistance. In the structure of FIGS. 27A and 27B, in order to reinforce the structure of FIGS. 26A and 26B, the number of coupling portions e is increased, and meshes are provided around portions at which the coupling portions e are formed. This configuration increases the mechanical strength, although the magnetic resistance is increased.

According to the present invention, an attracting force is generated between magnetic poles formed in the plurality of magnetic pole pieces in the magnetic pole piece array and magnetic poles formed by permanent magnets disposed adjacent to the magnetic pole pieces, allowing enhancement of thrust of a mover. In addition, the permanent magnet array and the winding portions are disposed together in one of the stator and the mover. This facilitates assembly, and reduces the number of winding portions and permanent magnets.

While certain features of the invention have been described with reference to example embodiments, the description is not intended to be construed in a limiting sense. Various modifications of the example embodiments, as well as other embodiments of the invention, which are apparent to persons skilled in the art to which the invention pertains, are deemed to lie within the spirit and scope of the invention.

What is claimed is:

1. An electric machine comprising:
a stator; and
a mover capable of reciprocal linear motion with respect to the stator,
one of the stator and the mover including one or more permanent magnet arrays and one or more winding portions,
each of the one or more permanent magnet arrays including at least one of:
a plurality of permanent magnets arranged such that magnetic poles having the same polarity face each other, and
a plurality of discrete permanent magnet arrays, wherein each discrete permanent magnet array includes a plurality of permanent magnets arranged such that magnetic poles having the same polarity face each other,
wherein each winding portion of the one or more winding portions includes a winding conductor in the form of a coil and disposed to surround the one or more permanent magnet arrays,
the other of the stator and the mover including one or more magnetic pole piece arrays,
wherein each magnetic pole piece array includes a plurality of magnetic pole pieces spaced along a corresponding permanent magnet array of the one or more permanent magnet arrays,
wherein a pitch of the plurality of permanent magnets and a pitch of the plurality of magnetic pole pieces are determined such that magnetic flux flows through two of the permanent magnets magnetized in the same direction and located in the permanent magnet array with one permanent magnet interposed between the two permanent magnets, and also flows through one or two of the magnetic pole pieces facing the one permanent magnet interposed between the two permanent magnets and magnetized in a direction different from the direction of magnetization of the two permanent magnets,
wherein the pitch of the plurality of magnetic pole pieces included in each magnetic pole piece array is defined as P=360° in terms of electrical angle, and
wherein the pitch of the plurality of permanent magnets included in each discrete permanent magnet array for the winding portion corresponding to one phase is defined as τp=P/2.

2. The electric machine according to claim 1, wherein the plurality of magnetic pole pieces each have a substantial plate, columnar, or annular shape.

3. The electric machine according to claim 1, wherein magnetic yokes are disposed on both polar sides of each of the plurality of permanent magnets.

4. The electric machine according to claim 3, wherein the plurality of permanent magnets and the magnetic yokes each have a cylindrical shape having a hollow portion extending in an extending direction of the permanent magnet array.

5. The electric machine according to claim 1, wherein the one or more magnetic pole piece arrays are housed inside a cylindrical member made of a non-magnetic material.

6. The electric machine according to claim 1, wherein the one or more winding portions are arranged to generate the magnetic flux to provide thrust to cause the mover to repeat the reciprocal linear motion between the permanent magnets and the magnetic pole pieces.

7. The electric machine according to claim 1, wherein the mover is configured such that the reciprocal linear motion of the move is caused by an external force, wherein the magnetic flux is generated by magnetic flux emitted from the plurality of permanent magnets of the one or more permanent magnet arrays when the reciprocal linear motion of the mover is caused by the external force.

8. The electric machine according to claim 6, wherein the winding portions corresponding to n phases are disposed along the permanent magnet array, n being an integer of 2 or more, and excitation currents with a phase difference of (360/n)° in terms of electrical angle are supplied to the n winding portions to cause the reciprocal linear motion of the mover.

9. The electric machine according to claim 6, wherein the winding portions corresponding to n phases are disposed along the permanent magnet array, n being an integer of 2 or more, and excitation currents with a phase difference of (360/(2×n))° in terms of electrical angle are supplied to the n winding portions to cause the reciprocal linear motion of the mover.

10. The electric machine according to claim 6, wherein the winding portions corresponding to n phases are each formed of a first divided winding portion and a second divided winding portion configured to have a phase opposite to that of the first divided winding portion, n being an integer of 1 or more, and the first and second divided winding portions of the n winding portions are disposed such that excitation currents with a phase difference of $(360/(2n))°$ in terms of electrical angle are sequentially supplied to the first and second divided winding portions.

11. The electric machine according to claim 8, wherein the following conditions are met:

$P=360°$ in terms of electrical angle;

$\tau m = q \times P \pm (1/n) \times P$, $q$ being a natural number; and $\tau p = P/2$, where:
- $\tau p$ denotes the pitch of the plurality of permanent magnets included in each discrete permanent magnet array provided for the winding portion corresponding to one phase;
- $\tau m$ denotes the pitch between an end surface of a first magnetic pole located on one end side of a first discrete permanent magnet array provided for the winding portion corresponding to one phase, and an end surface of a second magnetic pole located on one end side of a second discrete permanent magnet array provided for the winding portion corresponding to another phase and located on the other end side of the first discrete permanent magnet array, the first and second magnetic poles having the same polarity; and
- P denotes the pitch of the plurality of magnetic pole pieces included in each magnetic pole piece array.

12. The electric machine according to claim 8, wherein:
the n winding portions corresponding to n phases are each formed from a first divided winding portion and a second divided winding portion configured to have a phase opposite to that of the first divided winding portion, and the first and second divided winding portions of each of the n winding portions are disposed such that excitation currents with a phase difference of $(360/(2n))°$ in terms of electrical angle are sequentially supplied to the first and second divided winding portions; and
the following conditions are met:

$P=360°$ in terms of electrical angle;

$\tau m = 2 \times P + (1/(2 \times n)) \times P$; and $\tau p = P/2$, where:
- $\tau p$ denotes the pitch of the plurality of permanent magnets included in each discrete permanent magnet array provided for the divided winding portion of the winding portion corresponding to one phase;
- $\tau m$ denotes the pitch between an end surface of a first magnetic pole located on one end side of a first discrete permanent magnet array provided for the winding portion corresponding to one phase, and an end surface of a second magnetic pole located on one end side of a second discrete permanent magnet array provided for the winding portion corresponding to another phase and located on the other end side of the first discrete permanent magnet array, the first and second magnetic poles having the same polarity, the second magnetic pole being a magnetic pole located in the second position from an end of the second discrete permanent magnet array located on the other end side of the first discrete permanent magnet array; and
- P denotes the pitch of the plurality of magnetic pole pieces included in each magnetic pole piece array.

13. The electric machine according to claim 8, wherein: the following conditions are met:

$P=360°$ in terms of electrical angle;

$\tau c = 2 \times M \times \tau p/n$; and $\tau p = P/2 \pm P/(2 \times M)$, where:
- $2 \times M$ denotes the number of the plurality of permanent magnets included in each permanent magnet array, M being a natural number;
- $\tau p$ denotes the pitch of the plurality of permanent magnets included in each permanent magnet array, $\tau p$ being constant;
- $\tau c$ denotes the length of the winding portion corresponding to one phase; and
- P denotes the pitch of the plurality of magnetic pole pieces included in each magnetic pole piece array.

14. The electric machine according to claim 8, wherein:
n winding portions corresponding to n phases are each formed from a first divided winding portion and a second divided winding portion configured to have a phase opposite to that of the first divided winding portion, and the first and second divided winding portions of each of the n winding portions are disposed such that excitation currents with a phase difference of $(360/(2 \times n))°$ in terms of electrical angle are sequentially supplied to the first and second divided winding portions; and
the following conditions are met:

$P=360°$ in terms of electrical angle;

$\tau c = 2 \times M^* \tau p/(2 \times n)$; and $\tau p = P/2 \pm P/(2 \times M)$, where:
- $2 \times M$ denotes the number of the plurality of permanent magnets included in each permanent magnet array, M being a natural number;
- $\tau p$ denotes the pitch of the plurality of permanent magnets included in each permanent magnet array, $\tau p$ being constant;
- $\tau c$ denotes the length of each of the divided winding portions; and
- P denotes the pitch of the plurality of magnetic pole pieces included in each magnetic pole piece array.

15. The electric machine according to claim 8, wherein:
the n is 2; and
the following conditions are met:

$P=360°$ in terms of electrical angle;

$\tau m = q \times P \pm (1/4) \times P$, $q$ being a natural number; and $\tau p = P/2$, where:
- $\tau p$ denotes the pitch of the plurality of permanent magnets included in each discrete permanent magnet array provided for the winding portion corresponding to one phase;
- $\tau m$ denotes the pitch between an end surface of a first magnetic pole located on one end side of a first discrete permanent magnet array provided for the winding portion corresponding to one phase, and an end surface of a second magnetic pole located on one end side of a second discrete permanent magnet array provided for the winding portion corresponding to another phase and located on the other end side of the first discrete permanent magnet array, the first and second magnetic poles having the same polarity; and P denotes the pitch of the plurality of magnetic pole pieces included in each magnetic pole piece array.

16. The electric machine according to claim 8, further comprising:
a back yoke provided outside the n winding portions to form a part of a magnetic circuit.

17. The electric machine according to claim 16, further comprising:
a bearing fixed at each of both ends of the back yoke in the extending direction of the permanent magnet array to support the mover such that the mover is capable of the reciprocal linear motion but is not rotatable in a circumferential direction of the mover.

18. The electric machine according to claim 16, further comprising:
a magnetic tooth provided at each of both ends of the plurality of winding portions to face the magnetic pole piece array, the magnetic tooth being magnetically coupled to the back yoke.

19. The electric machine according to claim 10, further comprising:
a magnetic tooth provided at each of both ends of each of the first and second divided winding portions to face the magnetic pole piece array, the magnetic tooth being magnetically coupled to the back yoke.

20. The electric machine according to claim 1, wherein the permanent magnets are each formed by assembling a plurality of divided permanent magnets.

21. The electric machine according to claim 1, wherein the stator includes the one or more magnetic pole piece arrays, and the mover includes the one or more winding portions and the one or more permanent magnet arrays.

22. The electric machine according to claim 1, wherein the magnetic pole pieces are each formed by stacking magnetic steel sheets in an extending direction of the permanent magnet array.

23. The electric machine according to claim 1, wherein the plurality of magnetic pole pieces are formed by stacking magnetic steel sheets.

24. The electric machine according to claim 1, wherein one winding portion is provided, and an alternating current is supplied to the one winding portion to cause the mover to reciprocally vibrate.

25. The electric machine according to claim 1, wherein:
two winding portions are disposed side by side in an extending direction of the mover, and configured such that alternating currents having opposite phases are supplied to the two winding portions to cause the mover to reciprocally vibrate; and
the condition $P/4 < \tau p < P$ is met,
where:
$\tau p$ denotes the pitch of the plurality of permanent magnets; and
P denotes the pitch of the plurality of magnetic pole pieces.

26. The electric machine according to claim 1, wherein:
each permanent magnet array is configured to reciprocally move by means of an external force such that an alternating voltage is induced in each of the one or more winding portions; and
the condition $P/4 < \tau p < P$ is met,
where:
$\tau p$ denotes the pitch of the plurality of permanent magnets; and
P denotes the pitch of the plurality of magnetic pole pieces.

27. The electric machine according to claim 7, wherein the winding portions corresponding to n phases are each formed of a first divided winding portion and a second divided winding portion configured to have a phase opposite to that of the first divided winding portion, n being an integer of 1 or more, and the first and second divided winding portions of the n winding portions are disposed such that excitation currents with a phase difference of $(360/(2n))°$ in terms of electrical angle are sequentially supplied to the first and second divided winding portions.

28. The electric machine according to claim 8, wherein the following conditions are met:

$P=360°$ in terms of electrical angle;

$\tau m = q \times P \pm (1/n) \times P$, $q$ being a natural number; and $\tau p = P/2$, where:
$\tau p$ denotes the pitch of the plurality of permanent magnets included in each discrete permanent magnet array provided for the winding portion corresponding to one phase;
$\tau m$ denotes the pitch between an end surface of a first magnetic pole located on one end side of a first discrete permanent magnet array provided for the winding portion corresponding to one phase, and an end surface of a second magnetic pole located on one end side of a second discrete permanent magnet array provided for the winding portion corresponding to another phase and located on the other end side of the first discrete permanent magnet array, the first and second magnetic poles having the same polarity; and
P denotes the pitch of the plurality of magnetic pole pieces included in each magnetic pole piece array.

29. The electric machine according to claim 9, wherein:
the n winding portions corresponding to n phases are each formed from a first divided winding portion and a second divided winding portion configured to have a phase opposite to that of the first divided winding portion, and the first and second divided winding portions of each of the n winding portions are disposed such that excitation currents with a phase difference of $(360/(2n))°$ in terms of electrical angle are sequentially supplied to the first and second divided winding portions; and
the following conditions are met:

$P=360°$ in terms of electrical angle;

$\tau m = 2 \times P + (1/(2 \times n)) \times P$; and $\tau p = P/2$, where:
$\tau p$ denotes the pitch of the plurality of permanent magnets included in each discrete permanent magnet array provided for the divided winding portion of the winding portion corresponding to one phase;
$\tau m$ denotes the pitch between an end surface of a first magnetic pole located on one end side of a first discrete permanent magnet array provided for the winding portion corresponding to one phase, and an end surface of a second magnetic pole located on one end side of a second discrete permanent magnet array provided for the winding portion corresponding to another phase and located on the other end side of the first discrete permanent magnet array, the first and second magnetic poles having the same polarity, the second magnetic pole being a magnetic pole located in the second position from an end of the second discrete permanent magnet array located on the other end side of the first discrete permanent magnet array; and P denotes the pitch of the plurality of magnetic pole pieces included in each magnetic pole piece array.

30. The electric machine according to claim 9, wherein: the following conditions are met:

$P = 360°$ in terms of electrical angle;

$\tau c = 2 \times M \times \tau p / n$; and $\tau p = P/2 \pm P/(2 \times M)$, where:

$2 \times M$ denotes the number of the plurality of permanent magnets included in each permanent magnet array, M being a natural number;

$\tau p$ denotes the pitch of the plurality of permanent magnets included in each permanent magnet array, $\tau p$ being constant;

$\tau c$ denotes the length of the winding portion corresponding to one phase; and P denotes the pitch of the plurality of magnetic pole pieces included in each magnetic pole piece array.

* * * * *